(12) United States Patent
Egan et al.

(10) Patent No.: US 7,386,028 B2
(45) Date of Patent: Jun. 10, 2008

(54) REDUCED EMI DEVICE AND METHOD THEREOF

(75) Inventors: Kenneth W. Egan, Austin, TX (US); Gregory T. Chandler, Austin, TX (US); Jitendra K. Budwal, Austin, TX (US); James J. Remedi, Austin, TX (US); Ted Beck, Austin, TX (US); Stephen J. Sheafor, Austin, TX (US)

(73) Assignee: VizionWare, Inc., Austin, TX (US)

( * ) Notice: Subject to any disclaimer, the term of this patent is extended or adjusted under 35 U.S.C. 154(b) by 311 days.

(21) Appl. No.: 11/003,986

(22) Filed: Dec. 3, 2004

(65) Prior Publication Data

US 2005/0084021 A1 Apr. 21, 2005

Related U.S. Application Data

(63) Continuation-in-part of application No. 10/357,255, filed on Feb. 3, 2003.

(60) Provisional application No. 60/354,234, filed on Feb. 4, 2002, provisional application No. 60/365,330, filed on Mar. 18, 2002, provisional application No. 60/365,348, filed on Mar. 18, 2002, provisional application No. 60/383,455, filed on May 25, 2002.

(51) Int. Cl.
*H04B 1/69* (2006.01)
*H04B 3/00* (2006.01)

(52) U.S. Cl. ............................. 375/130; 375/257
(58) Field of Classification Search ........... 375/130, 375/140–147, 257, 367
See application file for complete search history.

(56) References Cited

U.S. PATENT DOCUMENTS

| 4,392,220 | A | * | 7/1983 | Hirosaki et al. ............ 370/479 |
|---|---|---|---|---|
| 5,889,819 | A | | 3/1999 | Arnett |
| 5,909,472 | A | | 6/1999 | Arnett |
| 6,167,103 | A | | 12/2000 | Hardin |
| 6,259,723 | B1 | * | 7/2001 | Miyashita ................ 375/141 |
| 6,501,307 | B1 | | 12/2002 | Yen |
| 6,687,322 | B1 | * | 2/2004 | Zhang et al. ............ 375/376 |
| 2003/0118080 | A1 | | 6/2003 | Hailey |
| 2003/0169838 | A1 | | 9/2003 | Greenstreet |
| 2004/0247027 | A1 | | 12/2004 | Wang |

FOREIGN PATENT DOCUMENTS

| EP | 0 823 801 A | 2/1998 |
|---|---|---|
| JP | 1 0143271 A | 5/1998 |
| TW | 223 505 B | 11/2004 |
| WO | WO 00/21237 A | 4/2000 |

\* cited by examiner

*Primary Examiner*—Don N Vo

(57) ABSTRACT

A method and system is disclosed for spreading the power associated with digital signals being transmitted to reduce electromagnetic interference (EMI) emissions by receiving, via a first transmission line, a first power spread signal representative a first digital signal modified using a first power spreading digital noise signal, modifying the power spread signal using a second power spreading digital noise signal substantially similar to the first power spreading digital noise signal to generate a second digital signal substantially similar to the first digital signal, modifying the second digital signal using a third power spreading digital noise signal to generate a second power spread signal and providing the second power spread signal for output to a second transmission line.

23 Claims, 20 Drawing Sheets

REDUCED EMI DEVICE AND METHOD THEREOF

CROSS-REFERENCE TO RELATED APPLICATIONS

This application is a continuation-in-part application of U.S. patent application Ser. No. 10/357,255 filed on Feb. 3, 2003 and entitled "METHOD AND SYSTEM OF REDUCING ELECTROMAGNETIC INTERFERENCE" which claims priority to the following provisional applications: U.S. patent application Ser. No. 60/354,234 filed on Feb. 4, 2002, entitled "CLOCK DISTRIBUTION METHOD WITH PROGRAMMABLE RADIATED EMISSIONS REDUCTION"; U.S. patent application Ser. No. 60/365,330 filed on Mar. 18, 2002 and entitled "GATED DIRECT SEQUENCE SPREAD SPECTRUM CLOCK RECEIVER DESIGN"; U.S. patent application Ser. No. 60/365,348, filed on Mar. 18, 2002 and entitled "GATED PSEUDO-RANDOM (GPN) GENERATOR FOR CLOCK DISTRIBUTION APPLICATION"; and U.S. patent application Ser. No. 60/383,455, filed on May 25, 2002 and entitled "GATED DIRECT SEQUENCE SPREAD SPECTRUM CLOCK DISTRIBUTION SYSTEM AND METHOD FOR USING SAME," the entireties of which are incorporated by reference herein.

This application is related to the following applications, the entireties of which are incorporated by reference herein: U.S. patent application Ser. No. 11/003,882 entitled "REDUCED EMI USING TRANSMISSION OFFSETS" and filed on even date herewith; U.S. patent application Ser. No. 11/004,154, entitled "NOISE SOURCE SYNCHRONIZATION FOR POWER SPREAD SIGNALS" and filed on even date herewith; U.S. patent application Ser. No. 11/004,423, entitled "REDUCED EMI USING MULTIPLE NOISE SOURCES" and filed on even date herewith; and U.S. patent application Ser. No. 11/003,074, entitled "REDUCED EMI IN PARALLEL TRANSMISSIONS" and filed on even date herewith.

BACKGROUND

1. Field of the Invention

The present invention relates to the general field of electromagnetic interference and radiated emissions, and more particularly to electromagnetic and radiated emission reduction techniques.

2. Description of the Related Art

Increasingly, clock distribution has become an important issue in the design of computers, communication devices, and advanced entertainment systems as higher performance features/faster microprocessors are integrated into these systems. These enhancements typically require incorporating higher frequency clock oscillators, as the clock speed is directly proportional to the speed of the microprocessor processing the information. However, devices supporting high speed clock and data paths are susceptible to internal and external radiation problems. For example, computer, telecommunication, and entertainment systems have sensitive audio, video, and graphics circuitries, the performance of which can be affected by internal EMI radiation. Furthermore, excessive internal EMI radiation degrades the quality of video, audio, and graphics, and causes system timing errors. EMI concerns in external devices having high clock and data rates raise FCC (U.S. Federal Communication Commission) compliance issue problems, as these systems and devices often have electromagnetic interference (EMI) requirements.

In general, to keep radiated EMI levels to a desired level, for FCC purposes or internal considerations, computer system designers typically employ techniques such as slowing down the clock, controlling rising and falling edges, utilizing the method of Spread Spectrum Clock Generation (SSCG), and/or shielding. While each of these EMI reduction techniques is effective to varying degrees, each also suffers attendant limitations.

For example, shielding requires the use of expensive conductive material to prevent emitted radiation from leaking outside of the shielded enclosure. This, however, increases heat accumulation inside the computer, which can be exacerbated by reduced airflow or inadequate ventilation.

The other methods, slowing the clock, data rising and falling edges, and SSCG, all result in reductions in the timing margins, in addition to other problems. Reductions of the timing margin are frequently undesirable for high-speed systems for which system timing is critical. Timing requirements of systems implementing SSCG are further limited by the very jitter generated, based upon a frequency modulated analog signal, to reduce the EMI emissions. Moreover, none of these EMI reduction methods is scalable. That is, the EMI reduction cannot be programmed without adversely impacting system timings. Furthermore, none of these methods wholly prevents radiation problems from occurring inside the computer.

Therefore, a method which overcomes these problems would be useful.

BRIEF DESCRIPTION OF THE DRAWINGS

The present disclosure may be better understood, and its numerous objects, features, and advantages made apparent to those skilled in the art by referencing the accompanying drawings. The use of the same reference symbols in different drawings indicates similar or identical items.

DETAILED DESCRIPTION OF THE PREFERRED EMBODIMENTS

One embodiment of the present disclosure provides a method for a gated direct sequence spread spectrum (GDSSS) clock distribution in which an original clock signal or other digital data signal is divided and spread over a wider frequency spectrum to reduce the radiated emissions. As used herein, a clock is defined as integrated circuit based timing devices. In one embodiment, a clock signal is modified by a power spreading signal that introduces small phase shifts. These phase shifts may be random, pseudo-random, non-linear, based on a polynomial progression, and the like. Unlike with typical spread system solutions, these frequency hops, which spread the energy spectra (EMI), can occur at the frequency of the clock.

References to the term power spreading signal and the term noise source are made extensively herein. A power spreading signal (also referred to herein as a digital noise signal) comprises any of a variety of digital signals which is expected to introduce phase shifts in a digital signal modified by the power spreading signal so as to reduce the EMI of the modified digital signal. Examples of power spreading signals include pseudo-random digital noise signals, random digital noise signals, Gaussian digital noise signals, non-linear spreading signals, polynomial progressions, and the like. Moreover, a power spreading signal may comprise a combination of multiple power spreading signals.

As will be understood from the following disclosure, a noise source includes any of a variety of components operable to produce one or more power spreading signals or combinations thereof. To illustrate, a noise source that produces a pseudo-random digital noise signal may comprise, for example, a linear feedback shift register (LFSR) may be used. A noise source that produces a random digital noise signal may comprise, for example, a quadratic residue code sequence generator. A noise source that provides a non-linear spreading signal may comprise, for example, a Golomb code generator. A noise source that provides a polynomial progression may comprise, for example, an elliptical curve generator.

Figure 1:
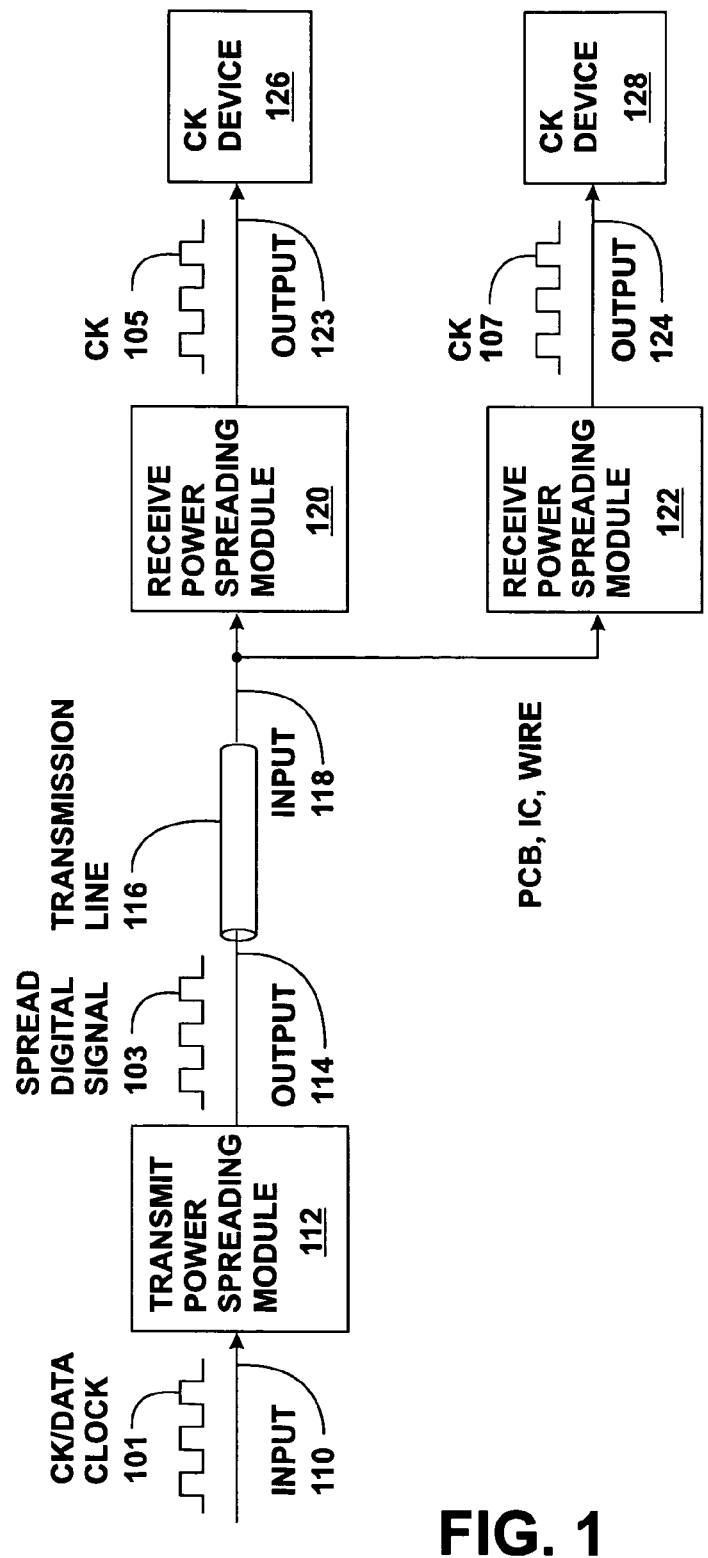
FIG. 1 is a simplified block diagram presenting an overview of the method for producing a spread digital clock signal according to at least one embodiment of the present disclosure.

The present disclosure is best understood with a reference to the specific embodiments illustrated herein. Specifically, FIG. 1 illustrates a block diagram presenting one embodiment of a clock distribution network system in accordance with the present disclosure. For ease of discussion, the exemplary techniques disclosed herein are described in the context of the transmission of signals via a single-ended transmission channel. However, these techniques may incorporate other signal reception and transmission techniques, such as differential pair transmission channels. Accordingly, unless otherwise specified, references to single-ended transmission lines or channels are also applicable to differential pair transmission lines or channels without departing from the spirit or the scope of the present disclosure.

In operation, a signal labeled clk/data 101 is received at an input 110. For purposes of discussion, the signal clk/data 101 can be referred to as either clock signal 101, or data signal 101 for ease of discussion. It will be appreciated that when referred to as clock 101, the element represents a digital signal comprising a substantially fixed frequency. Conversely, when referred to as data 101, the element comprises more than one frequency component.

Figure 2:
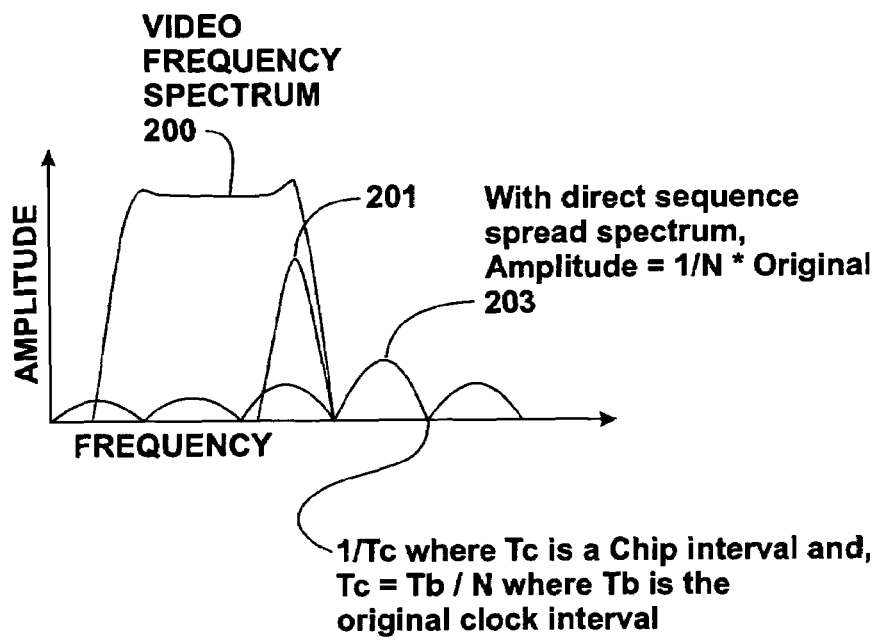
FIG. 2 is a graph illustrating a power profile of frequency components according to at least one embodiment of the present disclosure.

The clock 101 is received at a transmitting power-spreading module 112. Clock 101 may be a digital bit stream or a digital clock signal having a periodic trapezoidal-type waveform. EMI emissions from clock signal 101 are represented by the line 201 in FIG. 2, which is a power profile of a specific frequency component. Also illustrated in FIG. 2 is a frequency spectrum 200 that corresponds to an unmodified video frequency spectrum. As illustrated, the frequency component 201 of the clock 101 overlaps the frequency spectrum 200. This can result in interference with the video data, when the power of frequency component 201 is too large.

When received at transmitter power-spreading module 112, the clock/data signal 101 is modified using a power spreading signal to provide a spread digital signal 103 to output 114, which in turn is coupled to a transmission line 116. Spread digital signal 103 is represented by line 203 in the graph of FIG. 2, which indicates that the emissions of the clock/data signal 101 (line 201) have been spread over a larger frequency spectrum (line 203) as compared to the original clock/data, thereby reducing EMI, and potential adverse affects on other frequency spectra, such as the video spectrum 200.

Transmission line 116 is generally illustrated to be a non-wireless transmission media, such as a wire guide, printed circuit board trace, co-axial cable, integrated circuit trace, or any other form of non-wireless transmission media. As noted above, the transmission line 116 may include, for example, a single transmission line for carrying the spread signal 103 or a differential pair for carrying the spread signal 103.

Transmission line 116 provides the spread signal 103 via an input 118 to one or more receiver power spreading modules such as device 120 and 122. It will be appreciated that one or more receiver modules can be used, and that the receiver modules may reside on integrated circuit devices and/or on printed circuit board devices. The power spreading modules 120 and 122 in turn drive devices 126 and 128, which themselves may be printed circuit boards comprising integrated circuit devices. Typically, the receiver power spreading modules 120 and 122 will implement an identical power spreading signal. Therefore, for purposes of illustration, only one of the receiver power spreading modules 120 and 122 illustrated in FIG. 1 will be discussed.

Receiver power spreading module 120 receives the spread digital signal 103 and produces a clk/data signal 105 which is a representation of the original clk/data signal 101. Depending upon specific implementations, the clk/data signal 105 can have a known phase relationship with clk/data signal 103, or can be asynchronous relative to the clk/data signal 103. Specific implementations associated with the system of FIG. 1 will be better understood with reference to FIGS. 3-10.

Figure 3:
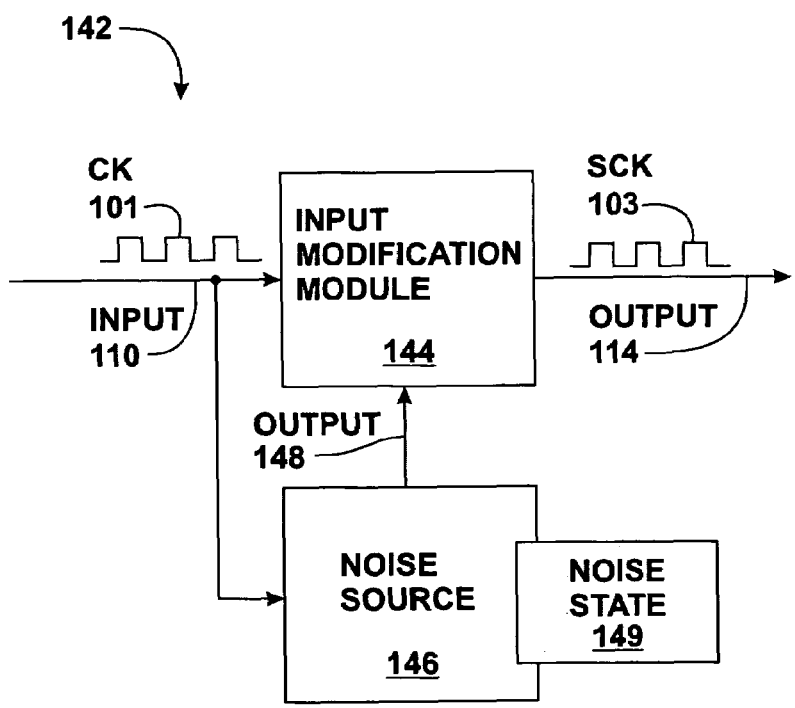
FIG. 3 is a block diagram illustrating an implementation of a transmit module according to at least one embodiment of the present disclosure.

FIG. 3 illustrates one implementation of a transmit module 142 according to one embodiment of the present disclosure. As seen in FIG. 3, the transmit module 142 comprises an input modification module 144 and a noise source 146. The noise source 156 may comprise any of a variety of noise sources capable of providing a power spreading signal. Examples of the noise source include, but are not limited to, a pseudo-random digital noise generator (such as a linear feedback shift register or LFSR), a random digital noise generator, a polynomial generator, a, quadratic residue code sequence generator or an elliptic curve generator. In another embodiment, noise source 146 can be a Gaussian digital noise generator. Noise source 146 may employ series of registers to produce a noise state to provide a binary stream to the input modification module 144, as will be discussed in greater detail below.

In operation, a clock signal 101 is provided to input modification module 144 via input 110. Clock signal 101 may also be provided to noise source 146, as indicated by the dotted line from input 110 to noise source 146, or a separate clock may be used to drive the pseudo random noise generator 146, such as when the signal 101 is a data signal. The noise source 146, in one embodiment, serves to generate a random sequence of noise states 149 that are used to provide a power spreading digital noise signal, generally comprising a binary data stream, onto output 148 for use by input modification module 144 to facilitate producing a spread digital signal 103 from the clock 101.

After implementing a power spreading signal provided by noise source 146, input modification module 144 transmits the spread digital clock signal 103 via output 114 to other modules in the system. In one embodiment, noise source 146 includes a look-up table. In another embodiment, noise source 146 may be a linear feedback shift register (LFSR). In yet another embodiment, the look-up table access, or the state sequence of the LFSR can be gated, or controlled by logic to produce any desired number of repeating states, as further discussed with reference to FIG. 4. In one embodiment, the number of repeating states is selected to be an even number of states to facilitate the use of a phase locked loop (PLL) circuit having an even divider in its feedback loop, which is more readily implemented than odd dividers.

Figure 4:
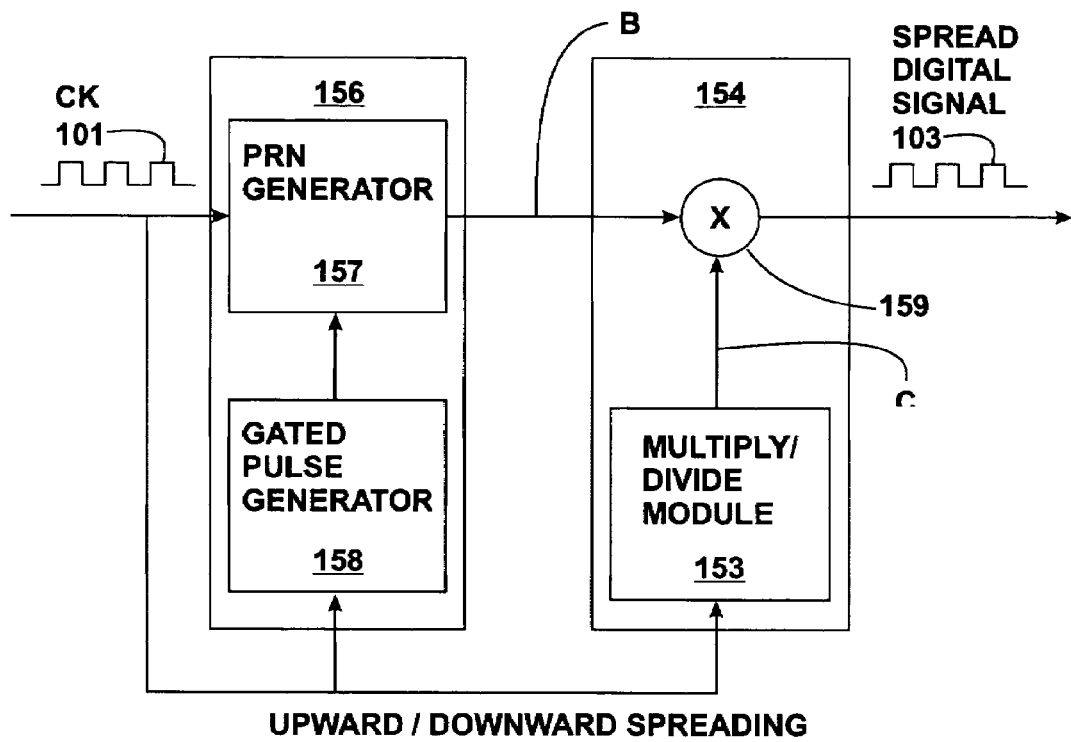
FIG. 4 is a block diagram illustrating one embodiment of a pseudo random noise generator according to at least one embodiment of the present disclosure.

FIG. 4 illustrates one embodiment of a pseudo random noise generator 156 (an exemplary implementation of the noise source 146) using a gated pseudo random number (PRN) generator 157, which may be implemented using an LFSR. A gated pulse generator 158 maintains a count or state based upon the number of pulses received at its input, while the PRN generator 157 cycles through a sequence of states and outputs a random binary stream B based on these states. In response to receiving a predefined number of pulses, the gated pulse generator 158 generates a reset signal to the pseudo random number generator 157, whereupon the pseudo random number generator 157 is reset or initialized to a starting value, and begins cycling through the sequence of states once again.

In one embodiment, the gated pulse generator 158 resets the pseudo random number generator 157 to allow for an even number of states to be generated. The gated pulse generator 158 can also be programmable so that the number of states in the sequence generated by the pseudo random number generator 157 is selectable by a system (e.g., application drivers or system BIOS) or by a user (e.g. based on a program state or by an external pin). By varying the number of states associated with the pseudo random number generator 157, the degree of EMI reduction can be varied, as discussed herein.

Module 154 is a more detailed embodiment of an input modification module, such as input modification module 144. Module 154 receives the clock 101 at a multiply/divide module 153. In response, a clock pulse C is provided to the multiplier 159 having a frequency component that can vary from the original clock 101. Below some multiplication value, e.g., 1, the clock pulse provided by multiply/divide module 153 will produce a clock having a frequency component less than or equal to clock 101. Above the multiplication value, the clock pulse provided by multiply/divide module 153 will produce a clock having a frequency component greater than or equal to the clock 101.

In this manner, the generated spread digital signal 103 can be "up-spread" to frequencies higher than the original clock 101, or "down-spread" to frequencies lower than the original clock 101. By facilitating up-spreading and down-spreading, it is possible to move EMI emissions away from critical frequencies.

The clock pulse from multiply/divide module 153 and the random binary stream from the pseudo random number generator 157 are combined by multiplier 159 to produce the spread digital signal 103. In one embodiment, the multiplier 159 is implemented using an exclusive-OR (XOR) gate.

Figure 5:
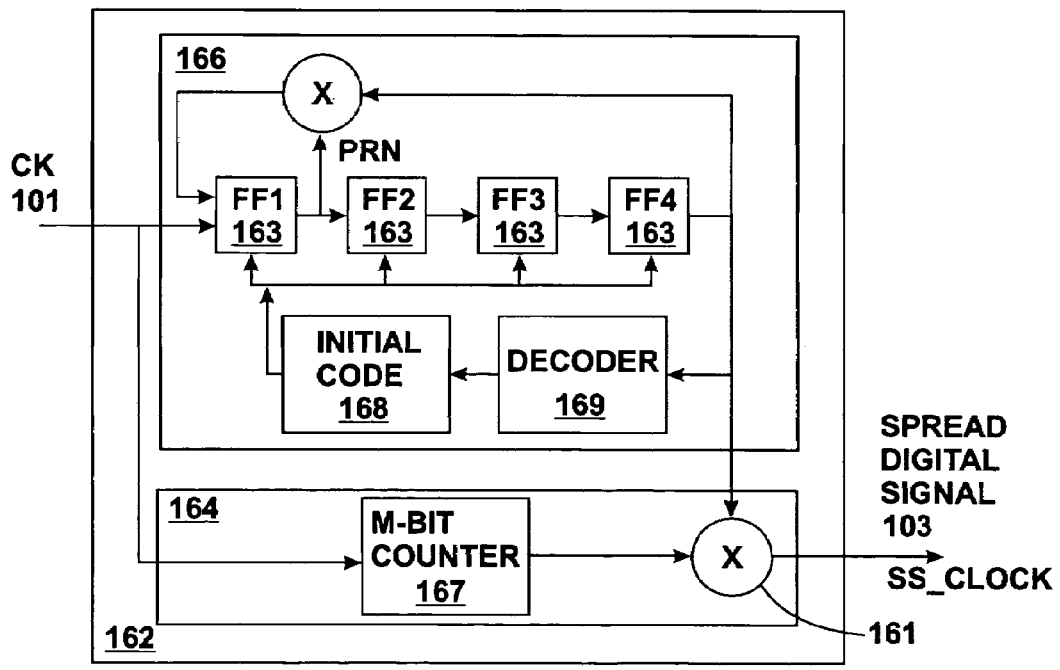
FIG. 5 is a block diagram illustrating a random digital noise generator or code generator according to at least one embodiment of the present disclosure.

FIG. 5 illustrates a block diagram 162 of an alternate embodiment of a transmit power spreading module. In one embodiment, a code generator such as Maximum-Length Shift-Register sequence generator or M-sequence generator 166 (exemplary implementations of a noise source), generates a random code $2^M-1$ states long, where M is the number of register stages 163, flip-flops 163 or storage elements 163 within the device 166. In another embodiment, the maximum-Length Shift Register sequence generator 166 generates a random code with $2_M$ states in length by having the decoder 167 decode the last state. For example, if four registers or flip-flops 163 (M=4) are implemented, then the repeated sequence will complete and then begin to repeat itself after transmitting fifteen bits (e.g., $2^{4-1}$ bits).

If four registers, e.g., flip-flops 163 (M=4), are used and an even number of states are desired, then the decoder 169 decodes the last state in the repeating sequence and inserts one additional initial state, such as the last state, to add an extra state to the sequence, therefore, repeating the sequence at $2^M$ cycles instead of $2^M-1$ cycles, as is common with DSSS applications using CDMA communication.

It will be appreciated that a pseudo-random number generator, such as, for example, the Maximum-Length Shift-Register sequence generator or m-sequence generator 166, generates a random code with $2^M-1$ bits long, where M is the number of register stages with feedback connections. The initial code loaded to the registers 163 is shifted to the left one bit at a time through a total of $2^M-1$ sequential shifts to complete one pseudo-random bit stream cycle. The feedback circuits between the M elements in the register (which is often one or more XOR gates connected to one or more of the M flip flops 163, input, and/or output of the circuit, and are not illustrated) ensures that the M bits change in state on each shift in order to transform the M bits into a $2^M-1$ pseudo-random repeating bit stream. Therefore, the device will cycle through all possible $2^M-1$ serial stream bit states before beginning to repeat the sequence again. In essence, the shift register is shifted back to the original state or binary value within in the M bit device every $2^M-1$ shifts. In practice, M may be any number and is usually a number greater than three.

Multiplier 161 receives a pseudo random binary stream from the output of FF4. A representation of clock 101 at a lower frequency is received from the M-Bit counter 167. The representation of the clock 101 at the output of the counter 167 is combined with the pseudo random binary stream from module 166 at the multiplier 161 to generate the spread digital signal 103. Once the spread digital signal 103 is transmitted by a transmit power spreading module, such as those illustrated in FIGS. 3-5, the spread digital signal 103 is received at a receiver power spreading module, such as, for example, modules 120, 122, or 170 as FIG. 1.

Moreover, in at least one embodiment, the noise source 146 may be configurable so as to facilitate the use different input codes for use in generation of a noise signal. To illustrate, the input of each of the M flip-flops 163 may be connected to the output of a respective multiplexer, where each multiplexer has as inputs the output of the previous state or the output of the previous state XOR'd (or XNOR'd) with the most significant bit of the noise source. Thus, the noise signal, and thus the EMI signature, may be changed by programming the transmit power spreading module or writing a value to one or more registers, where the register values/programming determine the control inputs to the multiplexers. This technique therefore may reduce or eliminate the need to make manufacturing-based changes to the transmit power spreading module to utilize new or different noise signals. It will also be appreciated that the noise source of the receiver also may be similarly configurable.

Figure 6:
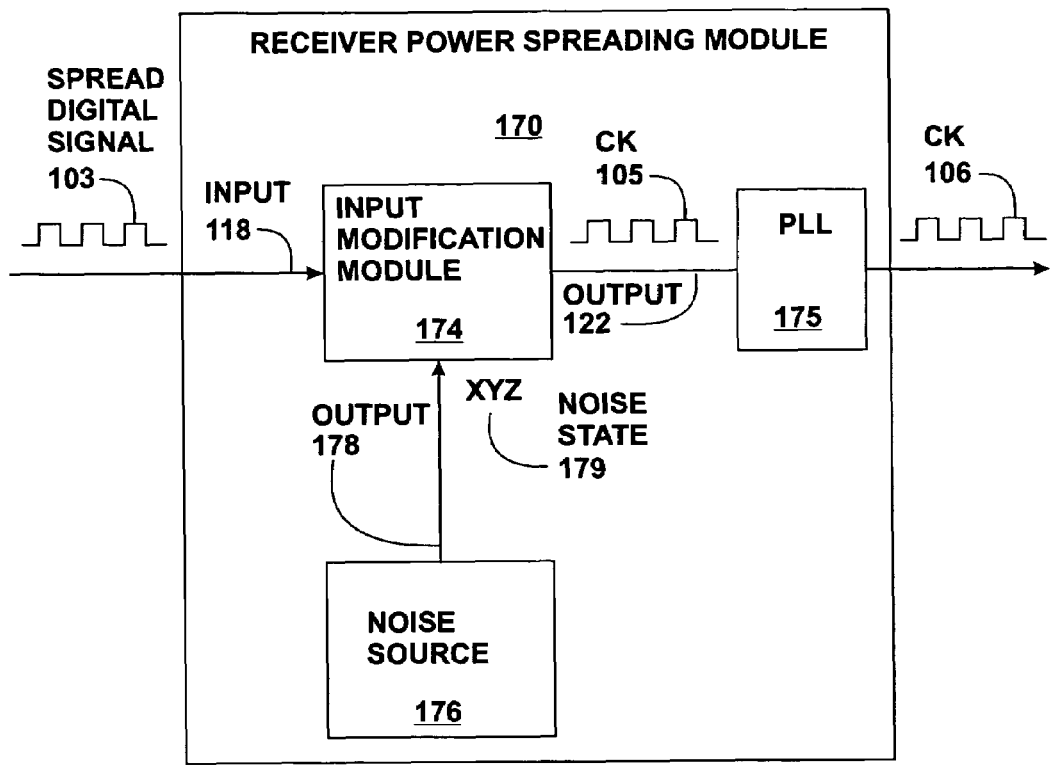
FIG. 6 is a block diagram illustrating a receive power spreading module according to at least one embodiment of the present disclosure.

FIG. 6 illustrates a receive power spreading module 170 which in one embodiment corresponds to a receive power spreading module 120 of FIG. 1. Receive power spreading module 170 includes input modification module 174 and a noise source 176. Typically, in a system such as is illustrated in FIG. 1, a receive power spreading module 120 will have a priori knowledge of the transmit power spreading module 112. Because of the a priori knowledge of the transmit power spreading module 112, the receive power spreading module 120 knows the exact noise source function implemented by the transmit power spreading module 112.

By implementing the identical noise source function in the noise source 176 as was implemented in the transmit power spreading module, it is possible to recover the clock/data 101, which was originally spread to produce the spread digital signal 103. In addition, the resulting clock 105 may be provided to a phase locked loop (PLL) 175 in order to generate a clock/data signal 106 that is synchronized to a known phase relationship with the original clock 101, by delaying the phase-locked loop feedback by an amount equivalent to an insertion delay, which includes the random number spreading signal.

It will be appreciated that the receive power spreading module 170 generates the clock 105 in two steps. The first step is an acquisition step, during which synchronization to the spread clock/data signal 103 is acquired. Acquisition is obtained by comparing the incoming bitstream with the power spreading signal of the noise source 176 on a clock by clock basis. If a particular state, random number code, or noise state is found to be a match, then the process continues to determine if state N+1 is also valid, otherwise the first noise state is held. If state N passes, it continues to the next state until all states are verified. Otherwise the process continues with the first initial state. Therefore, by providing a noise source 176 that generates the same noise states as the transmitting spreading module, it is possible to recover the original clock/data 101 in a manner that allows for synchronous system operation.

One advantage of the receive power spreading module 170 is that any noise induced upon the spread clock/data signal 103 is also spread and added to the noise floor of the clock signal 105. As a result of this spreading, any noise impulses on the spread clock/data signal 103 have little or no effect on the recovered clock 105 or 106. This is advantageous, in that with synchronous systems, it is desirable for the same number of clock pulses to be the same at various points of the system. Therefore, by spreading the EMI noise on the spread clock/data signal 103, the number of clock cycles received at the transmit power spreading module and the number of clock cycles produced by the receive power spreading module 170 can be maintained.

Figure 7:
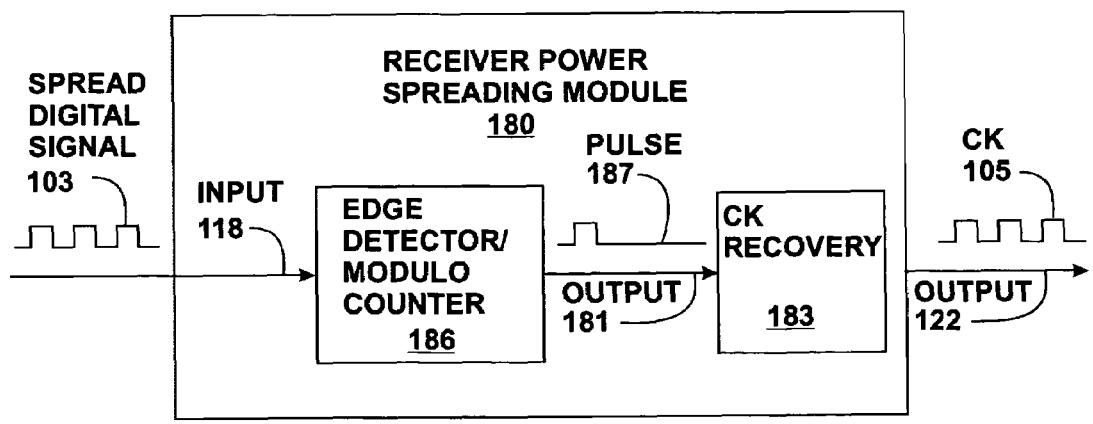
FIG. 7 is a block diagram illustrating another implementation of a receive power spreading module according to at least one embodiment of the present disclosure.

FIG. 7 illustrates yet another embodiment of a receive power spreading module 120. The receive power spreading module 180 receives the spread digital signal 103 at an input 118 coupled to an edge detector modular counter 186. The edge detector/modulo counter 186 interprets the information received on the spread digital signal 103 to generate a pulse at its output 181 which is used by a clock recovery module 183 to regenerate the original clock 101 as clock 105 on output 122.

Specifically, the edge detector/modulo counter 186 has a priori knowledge of the spread digital signal 103 being received. As a result, the edge detector/modulo counter 186 knows how many rising clock edges or falling clock edges the spread digital signal 103 will have in its repeating sequence. For example, for a $2^M$ sequence, where M is equal to 4, there will be a fixed number of clock transitions based upon the initial value with which the pseudo number generator was loaded. Therefore, the edge detector/modulo counter 186 includes a counting mechanism that generates a pulse 187 each time the spread digital signals 103 count sequence repeats. For example, assuming for a value of M there are to be a total of twelve rising edges, the edge detector modular counter 186 would generate a pulse 187 at output 181 every twelve clock edges.

The pulse generated at output 181 is provided to the clock recovery module 183 which includes a phase locked loop and a divide by N counter (not shown) in order to regenerate a representation of the original clock 101 illustrated as clock 105 at output 122. However, it will be appreciated that in a noisy environment where the spread digital signal 103 can pickup EMI noise, the EMI noise may be interpreted as an additional rising edge which would result in the pulse 187 at output 181 being generated at an unexpected time. This should result in the clock 105 not having a fixed frequency, thereby making it more difficult to implement in a synchronous system.

Figure 8:
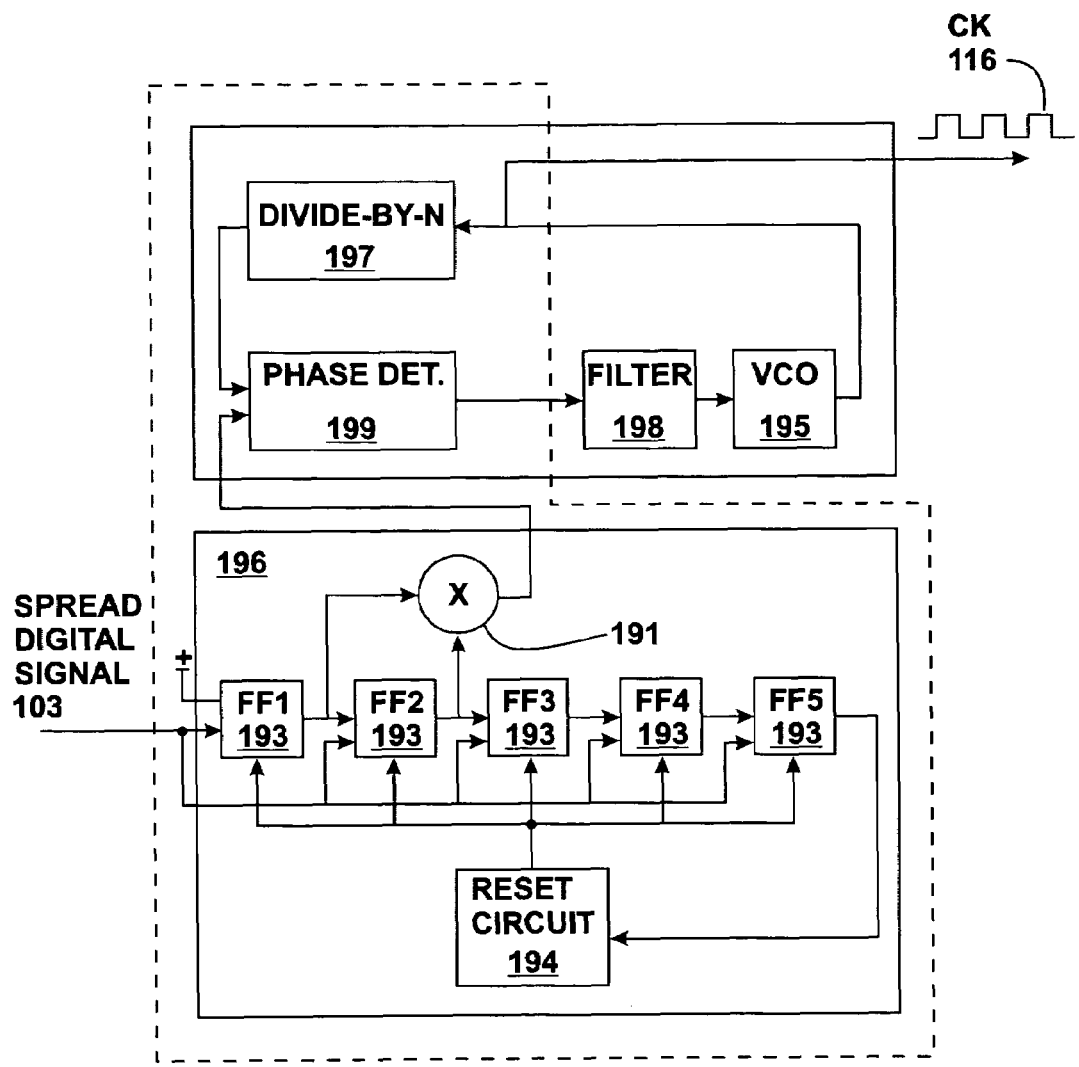
FIG. 8 is a block diagram illustrating a more detailed implementation of the receive power spreading module according to at least one embodiment of the present disclosure.

FIG. 8 illustrates a more detailed embodiment of the receive power spreading module of FIG. 7. The module 196 corresponds generally to the edge detector/modular counter 186 of FIG. 7. Specifically, five flip-flops 193 are connected serially with the last bit driving a reset circuit 194. The reset circuit 194 is in turn capable of resetting the series connected flip-flops 193 (FF1-FF5) in order to begin a new count.

While it will be appreciated that many types of counters can be used, the counter illustrated in module 196 operates by walking an asserted value along the flip-flop 193 chain with each active edge of the spread digital signal 103. For example, after a reset caused by reset circuit 194, the values on the outputs of each of the flip-flops 193 would be negated, i.e., zero. As a result, the multiplier 191, which functionally is an exclusive-OR, will provide a low value at its output. Upon receiving a first active edge from the spread digital signal 103, following reset, an asserted value, such as a logic level one, will be latched onto the output of the first flip-flop FF1.

As a result of the output of the first flip-flop FF1 being asserted, the exclusive-OR (XOR) function 191, now receiving an asserted signal and a negated signal, provides an asserted signal at its output. Following a next active edge transition of the spread digital signal 103, the asserted value at the output of the first flip-flop FF1 will be latched into the output of the second flip-flop FF2, as well as an asserted value being latched into the output of the first flip-flop FF1. Since the exclusive-OR function 191 has now received two asserted inputs, its output will be negated, where it will remain for the remainder of the counting sequence. The counting sequence will continue until the asserted signal is received at the output of the flip-flop five FF5, whereby the reset circuit will reset each of the flip-flops 193 that have negated values.

It will be appreciated that while the edge detector/modular counter 196 has been described as being reset to a negated value on each of its outputs in one embodiment, it will be appreciated that in other embodiments the reset circuit could preload a specific value into the flip-flops 193. In addition, while a simple bit walking counter has been implemented, other types of counters may be implemented.

In the manner described above, the XOR module 191 generates the pulse 187 (FIG. 7) which corresponds to the repeating of the spread digital signal 103 sequence based upon an expected count. This pulse 187 is provided to a phase detector 199, which in turn provides its output to a filter 198 that in turn provides its output signal to a VCO 195, which in turn provides its output signal to a divide by N counter 197 that is fed back to the phase detector 199. In this manner, the clock recovery module 183 (FIG. 7) can be implemented where the phase-locked loop stability is then is directly related to the relative duty cycle of incoming pulses to output clock frequency.

Figure 9:
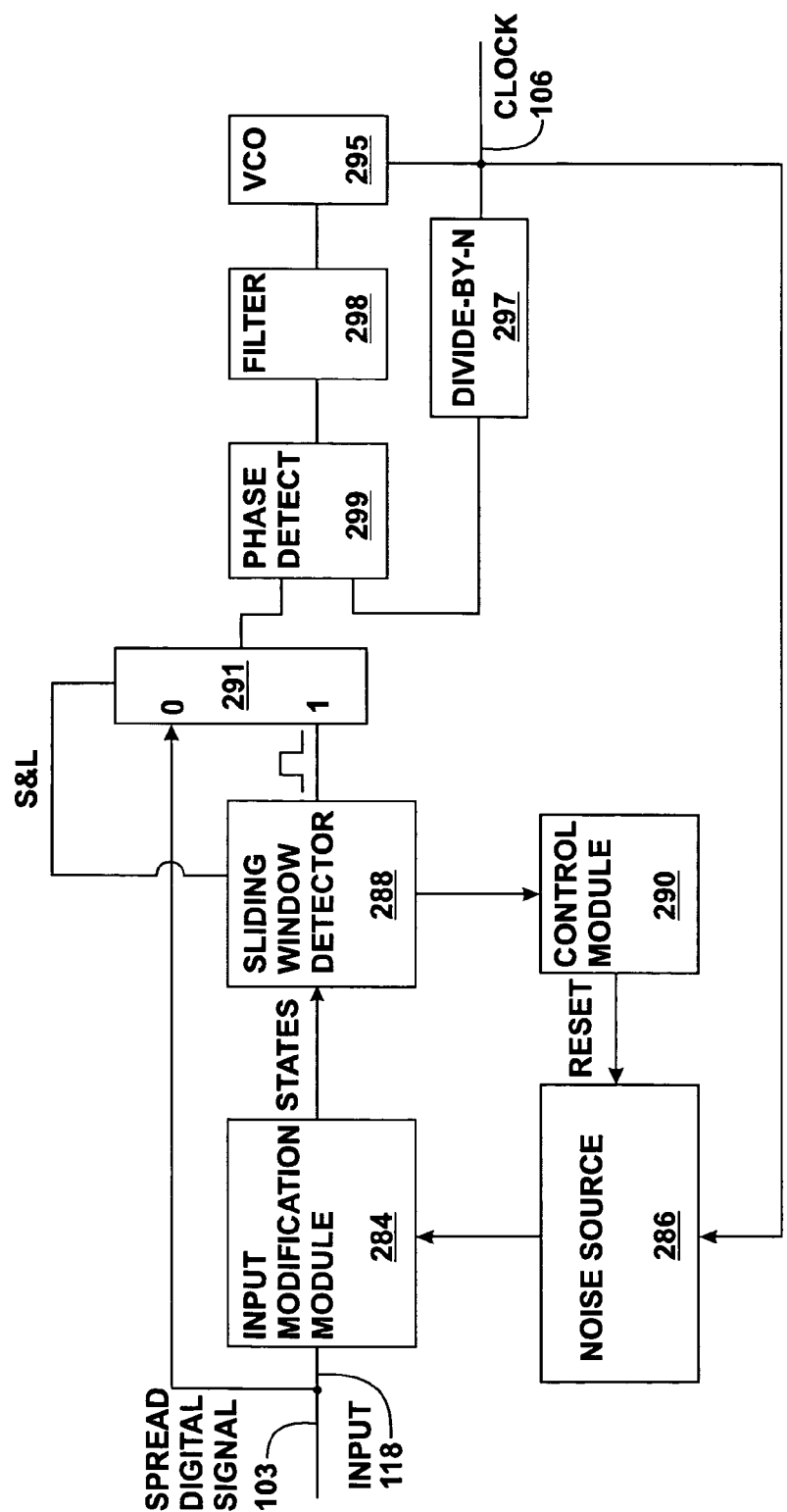
FIG. 9 is a block diagram illustrating another implementation of a receive power spreading module according to at least one embodiment of the present disclosure.

FIG. 9 illustrates yet another embodiment of a receive power spreading module 170. In operation, the receive power spreading module of FIG. 9 allows for the detection of a spread digital signal 103, whereby when detected, the spread digital signal 103 has its power re-spread in order to recover the original clock. However, when the presence of digital signal 103 is not detected, it is assumed that the signal being received at the input 118 of the input modification module 284 is an un-spread digital clock signal, which is passed through the system instead of regenerating the spread digital signal 103.

In order to describe the operation of the receive power spreading module of FIG. 9, it is assumed that the module is initially coming up from a reset state. When coming up from a reset state, the phase locked loop portion including VCO 295 is designed to generate an output clock that reasonably approximates an original clock expected to be recovered from the spread digital signal 103. This clock is provided to the noise source 286 and any other modules needing control during the startup process.

As a result of the startup process, the control module 290 holds the noise source 286 at a specific state, which in turn provides a value to the input modification module 284. For example, a logic one (1) can be provided to the input modification module 284 during the acquisition phase. Since the receive power spreading module of FIG. 9 is anticipating a spread digital signal having a specific signature, during the reset portion the input modification module 284 can receive the spread digital signal 103, and, by using the startup clock generated by the VCO, latch a sequence of values for states corresponding to the received spread digital signal 103.

It is these values or states which can be provided to a sliding window detector 288 to look for a predetermined sequence associated with the spread digital signal 103. For example, the spread digital signal 103 may have a sequence that repeats every 16 bits, however, the sliding window detector 288 knows that there is a unique bit sequence that can be detected by monitoring only a subset of that total number of bits. Therefore, for example, only three or four bits may need to be observed at one time in order to ascertain whether or not the signal being received actually contains the signature of the spread digital signal 103.

When the sliding window detector 288 positively identifies the spread digital signal 103 as being received, the control module 290 is signaled and the noise source 286 is taken out of reset and allowed to cycle through its states. In addition, the sliding window detector 288 activates a select line to multiplier 291 to allow the signal from the sliding window detector 288 to be passed to the phase detector 299 in order to allow the phase lock loop comprising the elements 299, 298, 295, and 297 to generate the clock 106, which is a representation of the original clock which was spread to generate the spread digital signal 103. Note that in this embodiment, the sliding window detector 288 may also need to provide a value to the divide by N counter 297 indicating that the phase locked loop may have to multiply the pulse being detected.

Note that since the noise source 286 is generating all the states and the input modification module 284 is modifying all the signals being received from the spread digital signal 103, that it would be possible for the input modification module to generate the clock 106 directly, and bypass the sliding window detector 288 in order to provide the clock to the phase detector 299 for clock acquisition. This clock can be generated to have a known phase relationship with the original clock 101, by delaying the phase-locked loop feedback by an amount equivalent to an insertion delay, which includes the random number spreading signal.

However, in another embodiment where the sliding window detector 288 never detects the expected signature from the spread digital signal 103, an assumption may be made that the signal being received at the input modification module 284 is not a spread digital signal 103, but an actual data or clock signal that should be passed through unaltered. In this case, the sliding window detector 288 would signal the multiplier 291 to pass the signal at its other input to the phase detector 299. It will be appreciated when the clock being received at the input is to be passed through to the output of the receive power spreading module 170, that the divide by N counter 297 may need to be reprogrammed in order to allow the signal to pass through without modification.

Once advantage of implementing a receive power module of the type illustrated in FIG. 9, is that either a known spread signal can be re-spread in order to generate an expected clock, or, for situations where it is desirable not to use a spread signal, an ordinary clock can be used and passed through the device.

Figure 10:
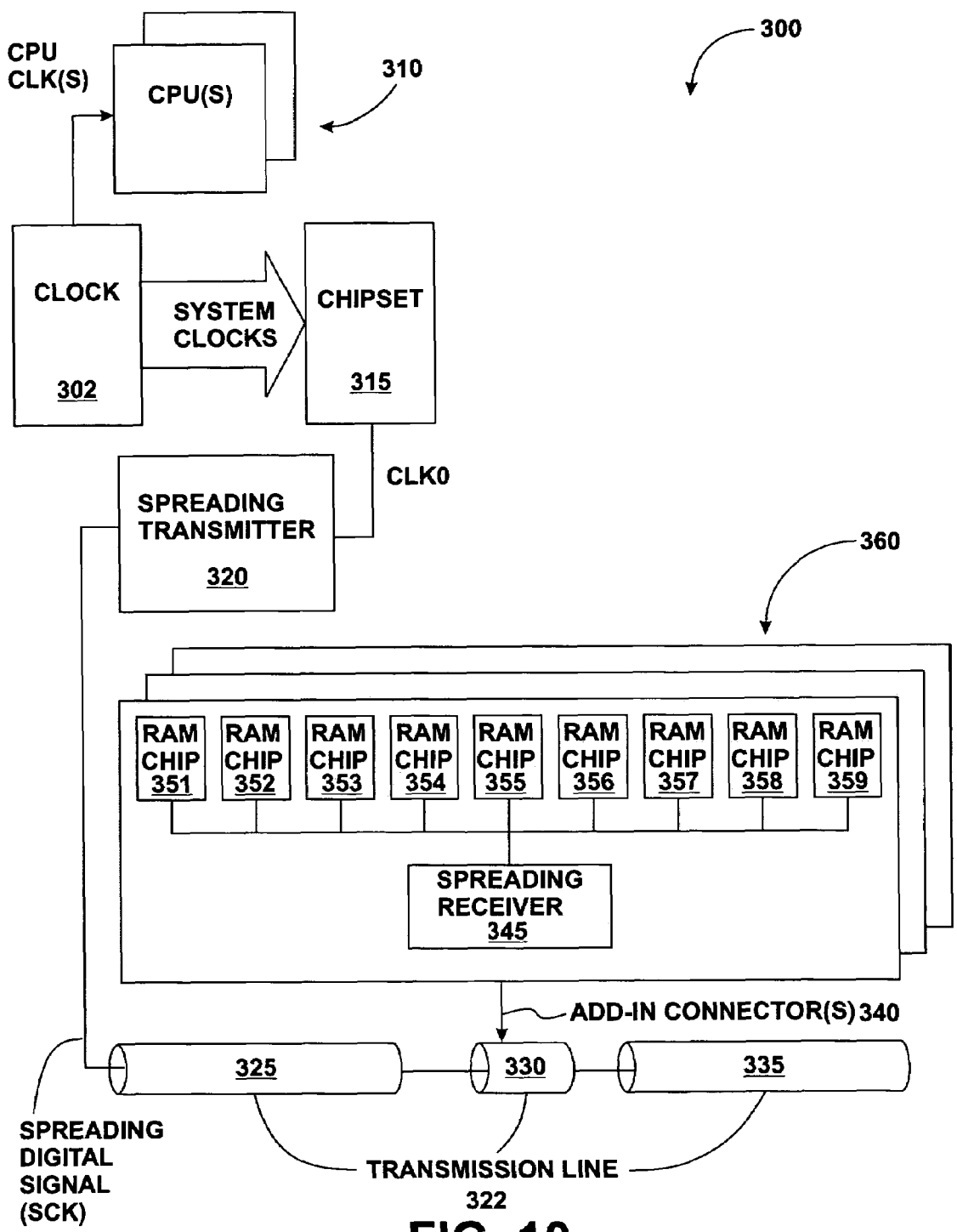
FIG. 10 is a block diagram illustrating an application utilizing the power spreading concepts according to at least one embodiment of the present disclosure.

FIG. 10 illustrates a specific application utilizing the power spreading concepts disclosed herein. It will be appreciated that the application of FIG. 10 can be any number of applications. For example, FIG. 10 can represent a motherboard, set-top-box, camera, printer, audio/video adapters, servers, or network equipment. The memory devices of FIG. 10 represent random access devices, such as dynamic random access devices and static random access devices. As device speeds increase, such as with dual data rate random access devices, the need to reduce emissions will also increase. Specifically, FIG. 10 includes a clock driver 302 that provides CPU clocks to CPU(s) 310, and clocks for use by other devices, such as other CPUs, add-in slots, or reference clocks, to a chipset 315. The chipset 315 can be used to control various functions and/or distribute various representations of the received clock.

In a specific embodiment, the chipset 315 transmits a clock 0 to a transmitter 320. The transmitter 320 operates in the manner previously described herein to provide a spread digital signal 103 to a transmission line 322. In the specific embodiment illustrated, this transmission line 322 comprises a trace on a printed circuit board, such as a motherboard of an information handling system. The transmission line 322 is illustrated to comprise three components, 325, 330, and 335. The transmission line 322 is not shown as a single transmission line in that due to the presence of add-in connectors 340 along the transmission line, an impedance discontinuity in the transmission line can occur. This impedance line discontinuity is represented by the transmission line portion 330.

As a result of the transmission line 330 discontinuity, EMI emissions can result in a noisy representation of the spread clock 103 being received at the receiver 345 on one of the memory devices 360. It will be appreciated that the memory devices 360 can represent memory add-in cards capable of increasing the amount of memory on an information processing system. In response to receiving the spread signal 103 from the transmission line 322, the receiver 345 will spread the power of the spread digital signal 103, to generate a representation of the original clock signal received at the transmitter 320.

As previously discussed, utilizing the disclosed transmission/receiver pair as illustrated, reduces the effect of noise not only transmitted by transmission line 322, but also the effects of noise received by transmission line 322, so that a clean clock signal can be generated by the receiver 345 and provided to the memory chips 351 through 359.

Figure 11:
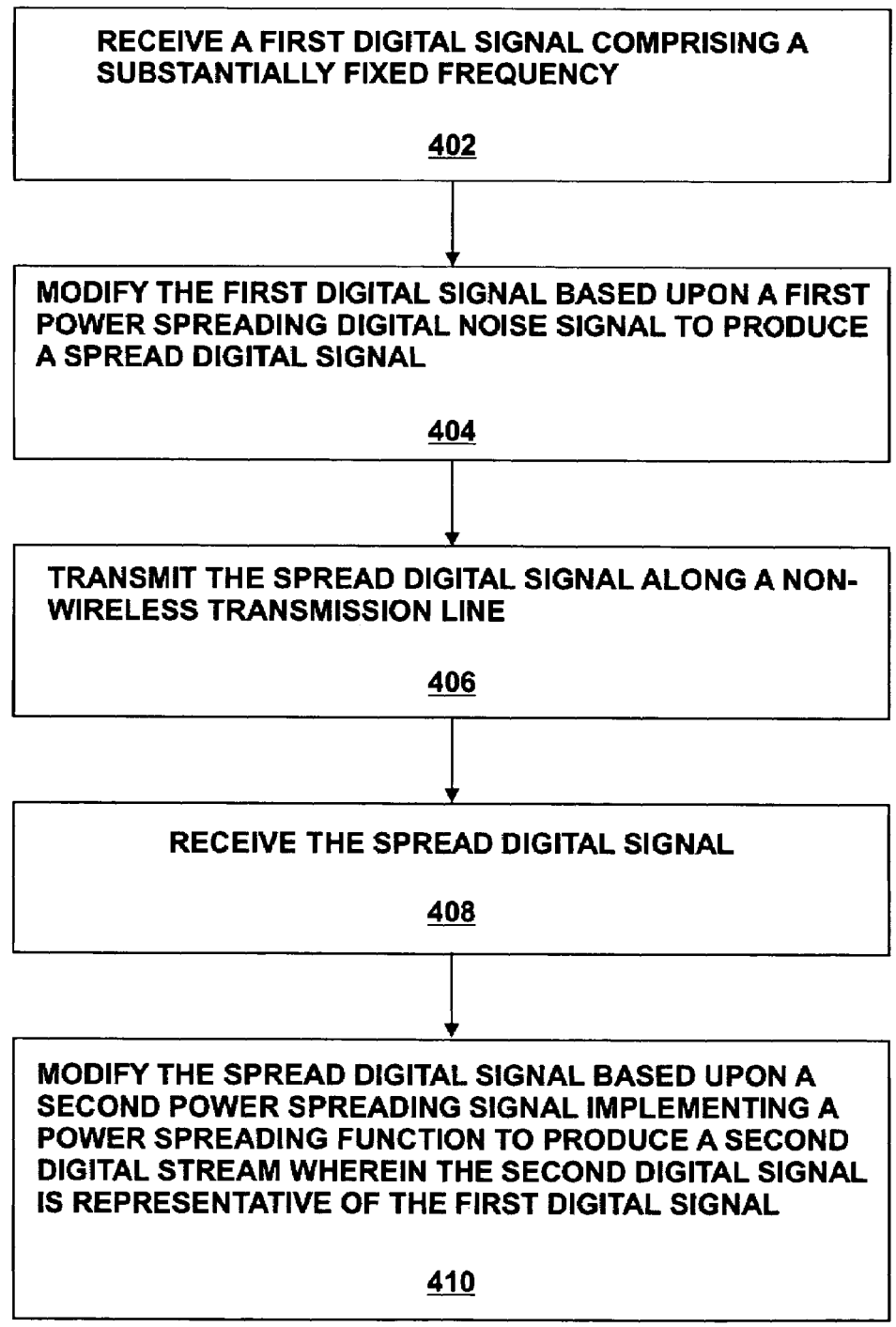
FIG. 11 is a flow diagram illustrating a method for producing a spread digital signal according to at least one embodiment of the present disclosure.

FIG. 11 illustrates, in flow diagram form, a method in accordance with a specific embodiment of the present disclosure. At step 402, a first digital signal comprising a substantially fixed frequency is received. In one embodiment, the first digital signal can be a clock signal used to provide timing control to various digital components. One example of a clock signal is a substantially trapezoidal-type waveform.

At step 404, the first digital signal is modified based upon a first power spreading digital noise signal to produce a spread digital signal. Typically, the first power spreading noise signal is provided by a noise source. Examples of suitable noise sources include pseudo random number generators, pseudo random Gaussian noise number generators, quadratic residue code sequence generators, elliptic curve generators, non-linear spreading signal generators, and the like. By modifying the first digital signal based upon the power spreading digital noise signal, a spread digital signal having its power spread over a larger frequency spectrum is obtained, thereby reducing the effects of EMI.

At step 406, the spread digital signal is transmitted along a non-wireless transmission line. Examples of non-wireless transmission lines include wire guides, integrated circuit device traces, and printed circuit board traces, as well as co-axial cables and the like. The spread digital signal is provided along the non-wireless transmission line to the receiving device.

At step 408, the spread digital signal is received from the transmission line at a receiving device. Then, in step 410, the spread digital signal is modified based upon a second power spreading signal implementing a second power spreading signal. In one embodiment, the second power spreading signal is identical to a power spreading signal utilized in the receive step 404. In response to modification of the digital signal, a second digital signal is produced wherein the second digital signal is representative of the first digital signal.

In another embodiment, the power spreading signal utilized in step 410 need not utilize the same power spreading signal as utilized in the step of modifying. As previously disclosed herein, a counter network can be used in order to effectively recover the clock, thereby spreading the power back to its original form. Likewise, random number generators producing the same random states can be used to modify the spread digital signal to generate the second digital signal representative of the first.

The method of FIG. 11 represents an advantage over the prior art, in that the EMI emissions from a clock signal transmitted over a transmission line can be reduced by spreading the harmonic energies over a greater frequency spectrum. In addition, the recovered clock can be recovered without introducing additional timing constraints on the system, because the recovered clock does not introduce any significant additional jitter into the system.

Figure 12:
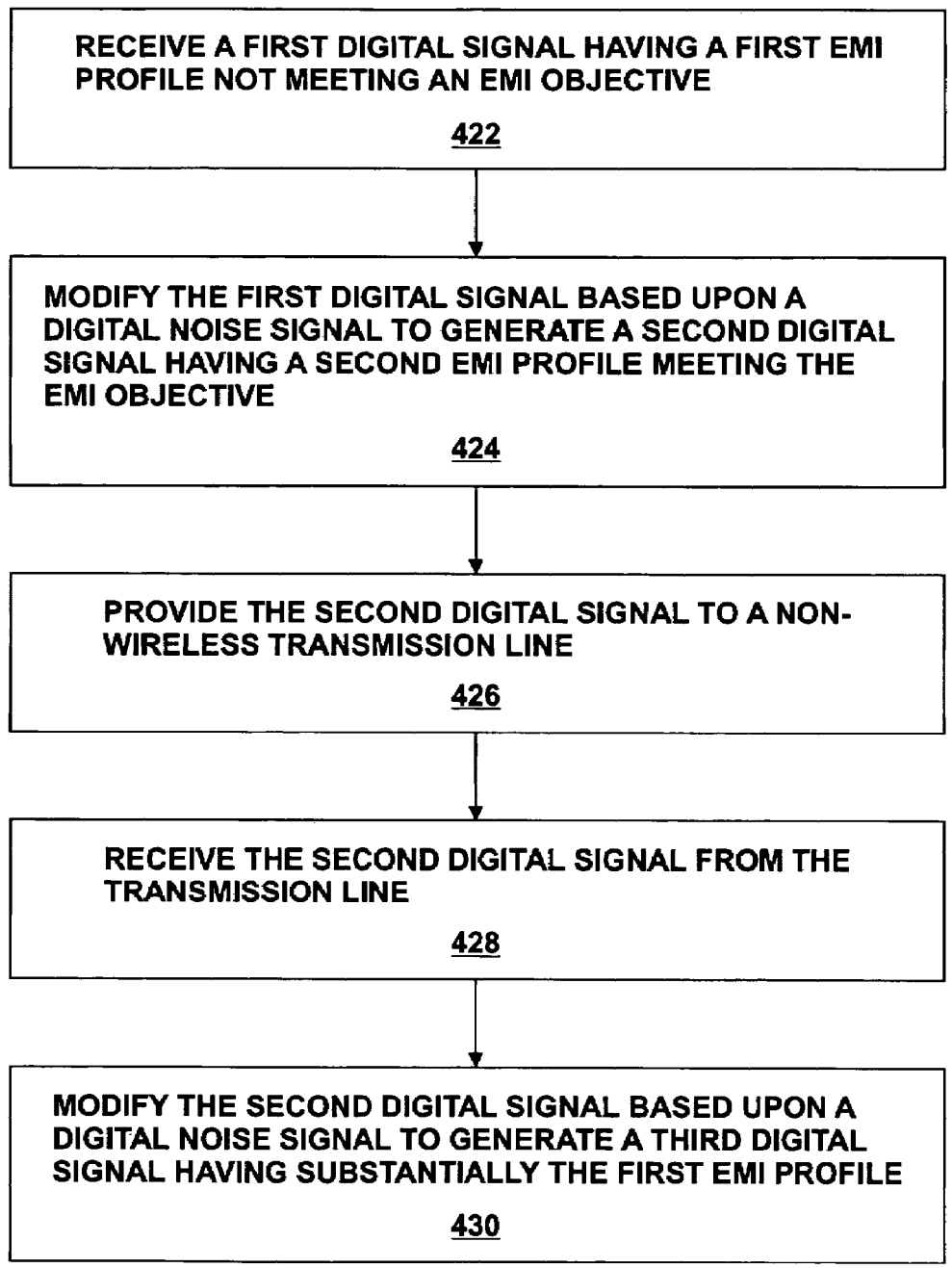
FIG. 12 is a flow diagram illustrating a method for EMI reduction according to at least one embodiment of the present disclosure.

FIG. 12 illustrates, in flow diagram form, another method in accordance with the present disclosure. At step 422, a first digital signal is received having a first EMI profile that does not meet an EMI objective. For example, a data or clock signal can be received that is known to provide EMI concerns in the system. In step 424, the first digital signal is modified based upon a random digital noise signal to generate a second digital signal having a second EMI profile that meets the EMI objective. One example of an EMI objective is to not surpass a given EMI emission level over a specific frequency. By modifying the signal at step 424, the EMI profile can be met.

At step 426, the second digital signal is provided to a non-wireless transmission line. Examples of non-wireless transmission lines include wire lines, integrated circuit traces, printed circuit board traces, coaxial cables, and the like.

At step 428, the second digital signal is received from the transmission line at a receiving device. In step 430, the second digital signal is modified based upon a digital noise signal to generate a third digital signal having substantially the first EMI profile. As previously described herein, the second digital signal having its power spread can be modified using a power spreading signal to generate a representation of the original clock.

Figure 13:
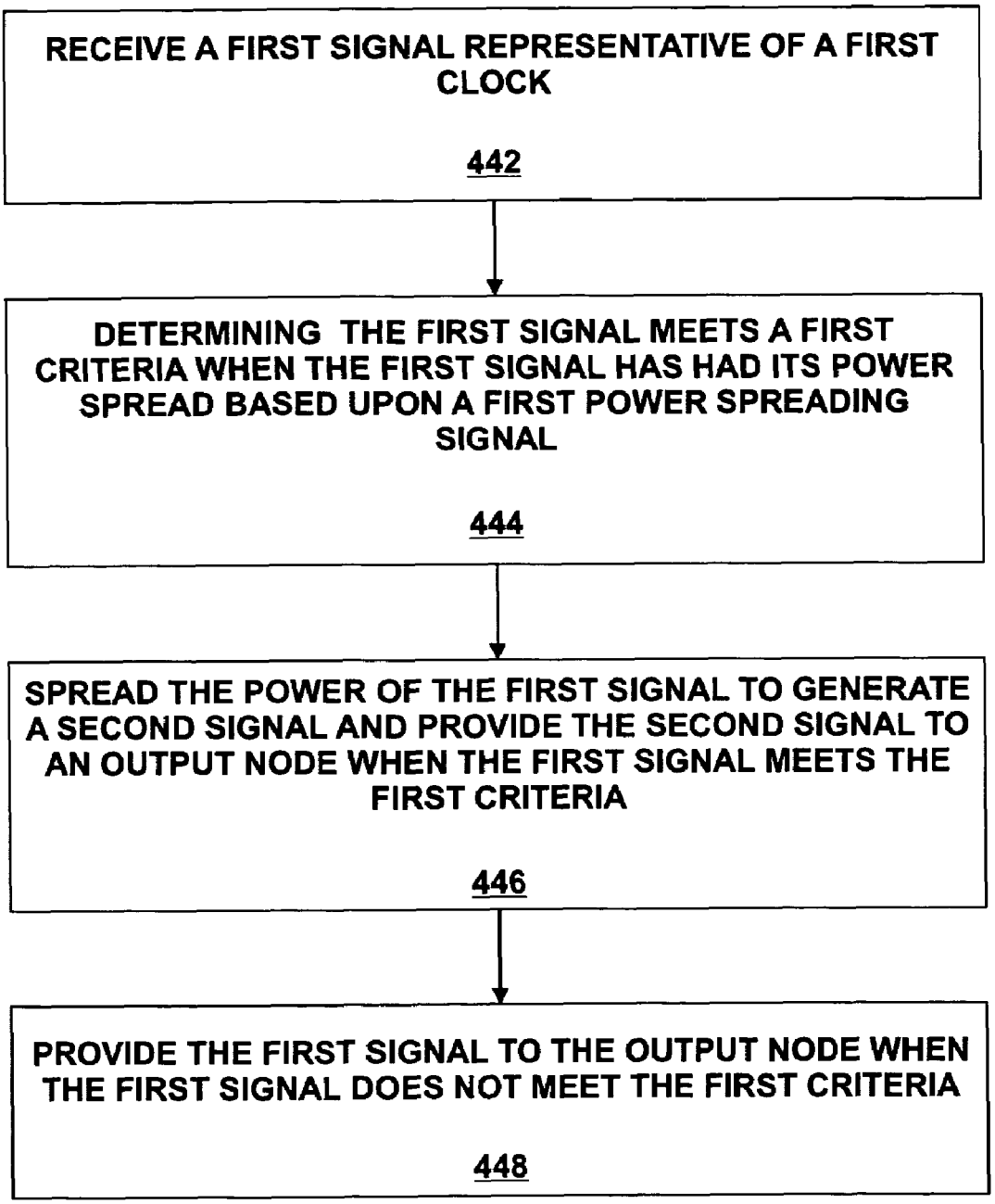
FIG. 13 is a flow diagram of a method for determining when a signal meets specific criteria according to at least one embodiment of the present disclosure.

FIG. 13 illustrates, in flow diagram form, a method in accordance with one embodiment of the present disclosure. At step 444, a first representation of a first clock is received. At step 444, a determination is made as to whether the first signal meets a first criterion when the first signal's power is spread based upon a first power spreading signal. For example, the first criteria can be, does the first signal, after having its power spread, result in a fixed frequency signal, similar to the first clock being generated. Another example of a first criteria would be, does the process of spreading the first signal's power result in a sequence of random states that is an expected sequence of random states.

When it is determined that the first criteria has been met at step 444, the flow proceeds to step 446. At step 446, the power of the first signal is spread to generate the second signal. This second signal is provided to an output node of a device to drive further devices. In effect, if an expected spread signal is received, it will be decoded, e.g. have its power spread, to provide a representation of the first clock signal.

If it is decided that the first signal does not meet the first criteria, the flow proceeds to step 448, where an alternate clock signal is provided at the output. In one embodiment, an alternate clock signal solution could be to provide the first signal received at step 442 to the output node in lieu of attempting to generate a clock by de-spreading the first signal. It will be appreciated that this specific embodiment is advantageous in that it allows for a spreading receiver/transmitting module to work with a variety of received signals.

Figure 14:
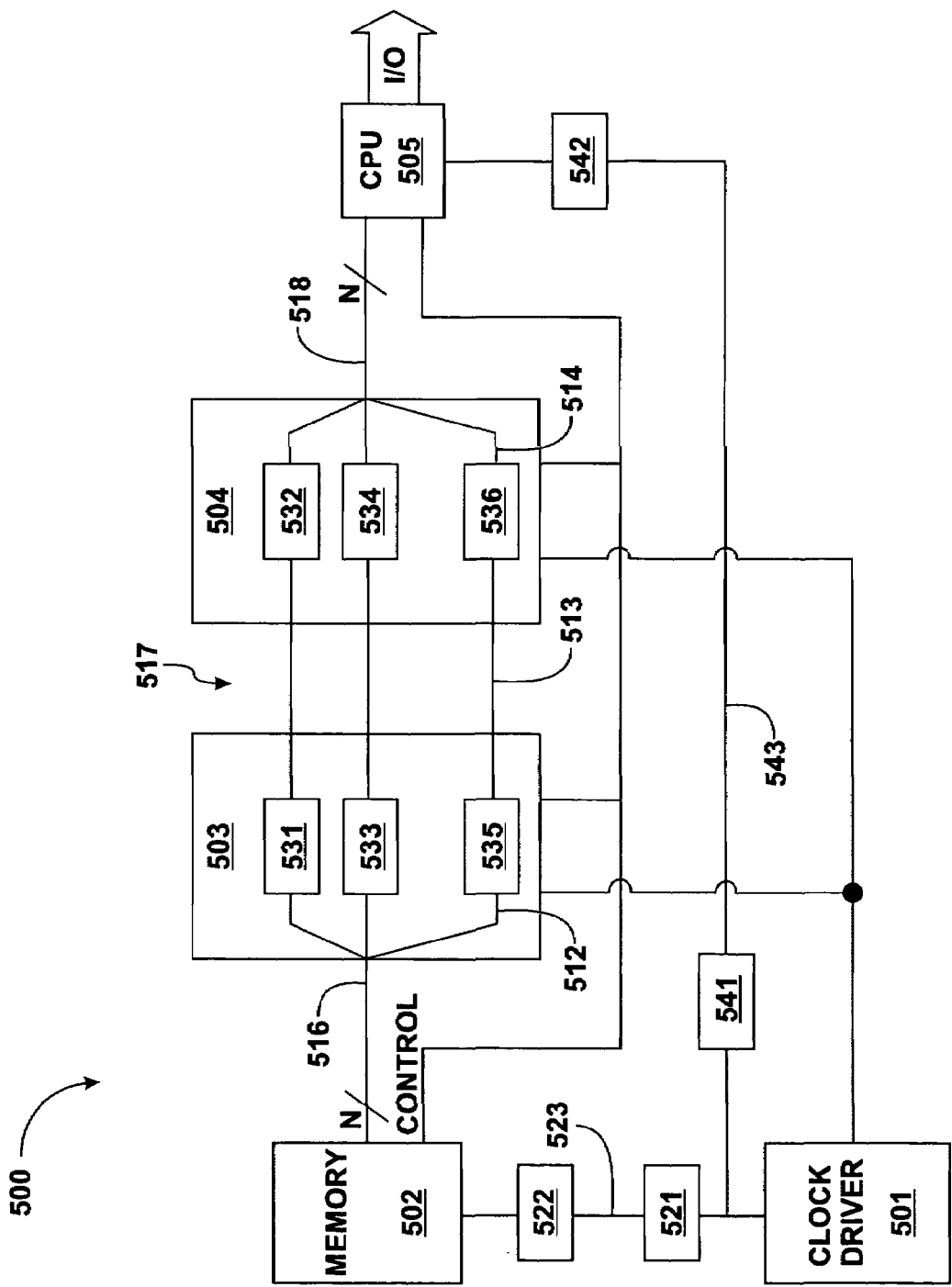
FIG. 14 is a flow diagram illustrating a method for modifying a digital bit stream according to at least one embodiment of the present disclosure.

FIG. 14 illustrates, in flow diagram form, a method in accordance with a specific embodiment of the present disclosure. At step 452 a first digital bit stream comprising a first frequency component with a first power profile is received. The first digital bit stream can comprise a fixed frequency clock, or data having a first frequency component.

At step 454, the first digital bit stream is modified based upon a first power spreading signal to produce a second digital bit stream representing the first frequency component with a second frequency component having a second power profile. For example, referring back to FIG. 2, the first frequency component of a first digital bit stream could be represented by the power profile 201 of FIG. 2. It will be appreciated where the first digital bit stream is a data bit stream, the power profile portion 201 would represent only a single frequency component associated with the data. Once modified, the second frequency component having a second power profile would be represented, for example, by the power profile 203. It is readily illustrated that the power profile of 203 is spread over a greater frequency range than that of the first digital bit stream. As a result, a bit stream that will produce lower EMI emissions is realized.

FIG. 14 illustrates, in block diagram form, a system implementing various aspects of the present disclosure. It will be appreciated that the system of FIG. 14 can represent any of a number of various applications. For example, FIG. 14 can represent a motherboard, set-top-box, camera, printer, audio/video adapters, servers, and/or network equipment, to name a few applications.

FIG. 14 illustrates a clock driver 501 for providing timing information to a memory 502, and a central processor unit (CPU) 505. However, instead of providing a fixed frequency signal to the memory 502 directly, the clock driver 501 is coupled to a transmit power spreading module 521. As described herein, the transmit power module 521 spreads the energy of the fixed frequency signal to generate a signal having a spread power spectrum and provides this spread signal to the transmission line 523. A receive module 522 coupled to the transmission line 523 receives the spread signal and provides a fixed frequency signal, representing the original clock, to the memory 502. It will be appreciated that the receive module 522 may be part of the memory device 502, and that the transmit module 521 may be part of the clock driver 501.

In a similar manner, instead of having clock driver 501 coupled directly to the CPU 505, the clock driver is coupled to a transmit power spreading module 541. As described herein, the transmit power module 541 spreads the energy of the fixed frequency signal to generate a signal having a spread power spectrum and provides this spread signal to the transmission line 543. A receiver module 542 coupled to the transmission line 543 receives the spread signal and provides a fixed frequency signal, representing the original clock, to the CPU 505. It will be appreciated that the receive module 542 may be integrated as part of the memory device 502, and that the transmit module 521 may be integrated as part of the clock driver 501.

Data is transmitted between the memory device 502 and the CPU over a memory bus that includes bus segments 516, 517 and 518. Typically, the memory device 502 will represent a high-speed memory, like a Dual Data Rate memory, that transmits data at data rates that can result in harmful EMI. Therefore, in the embodiment illustrated, each bitline of the data bus benefits from the spreading techniques disclosed herein. For example, bus segment 516 includes a bitline 512, which is provided to power spreading device 535 consistent with the present disclosure. Because data on a memory bus is typically bidirectional data, the power spreading 535 will typically include both a transmit power spreading module, and a receive power spreading module. Control signals from the memory/CPU would control which module is activated based upon whether a data read or a data write is being performed. When module 535 acts as a transmit module, the spread data would be transmitted over the bitline 513 to the module 536, which would be configured as a receive module to receive and process the spread data. The received spread data signal would be respread, using the same power spreading signal, to provide the original data to the CPU.

It will be appreciated that not every element of a system will need to implement the power spreading techniques described herein. For example, the clock signal to provide the power spreading components 503 and 504 is illustrated as not being spread. Likewise, the control information between the CPU 505 and the memory is illustrated as not being spread, since control data is generally not high speed data.

Figure 15:
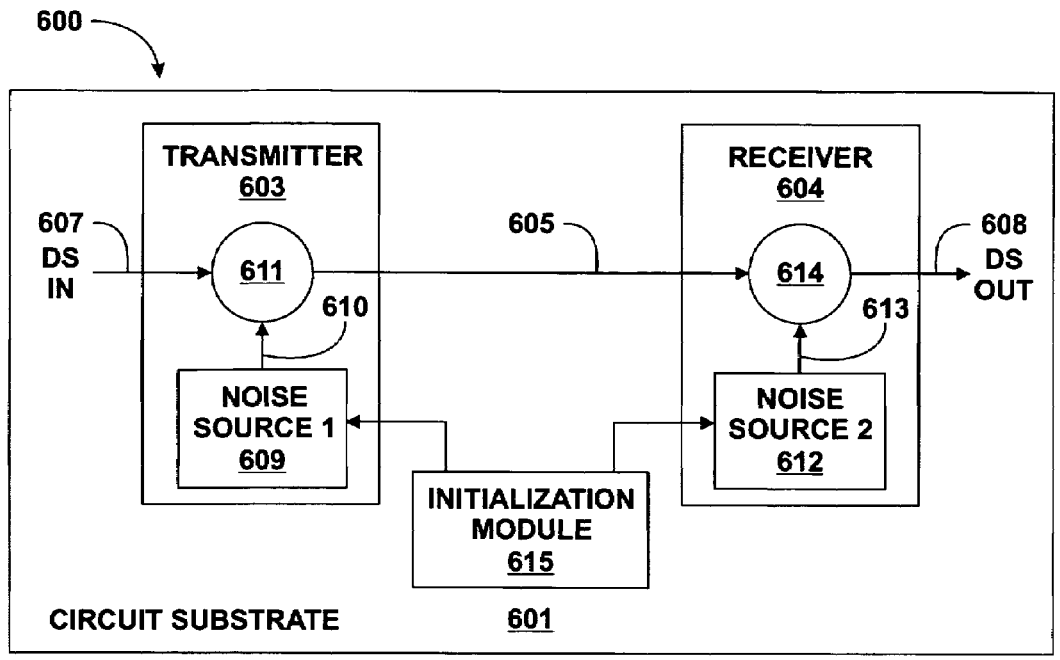
FIG. 15 is a block diagram illustrating an implementation of a spread stream signal system in a circuit device according to at least one embodiment of the present disclosure.

FIG. 15 illustrates a circuit device 600 implementing the reduced EMI techniques disclosed herein. The circuit device 600 comprises a circuit substrate 601 and a transmitter 603 and receiver 604 formed at the circuit substrate 601 and electrically coupled by one or more transmission lines 605. In embodiments wherein the circuit device 600 comprises a circuit board level device, the circuit substrate 601 may comprise a circuit board, such as, for example, a printed circuit board (PCB), the transmitter 603 and receiver 604 each may comprise, for example, an integrated circuit (IC) device or system-on-a-chip (SOC) and the transmission line 605 may comprise, for example, a PCB trace. In embodiments wherein the circuit device 600 comprises an IC device or a SOC, the circuit substrate 601 may comprise an integrated circuit substrate and the transmission line 605 may comprise an IC trace. In at least one embodiment, the transmission line 605 is the only communication path between the transmitter 603 and the receiver 604 for ease in implementing the circuit device 600 in a system. As described below, this may be achieved as certain information, such as when the transitions between power spread states and normal states, as well as the particular noise source or noise code used, may be determined by the receiver from the output of the transmitter provided over the transmission line 605, thus eliminating the need for a separate line to communicate such information.

In the illustrated embodiment, the transmitter 603 comprises an input to receive a digital signal 607, such as a digital clock signal or a digital data signal, and an output operably coupled to the transmission line 605 for providing a power spread representation of the digital signal 607 for transmission by the transmission line 605 to the receiver 604. Similarly, the receiver 604 comprises an input operably coupled to the transmission line 605 for receiving the power spread representation of the digital signal 607 and an output for providing a digital signal 608 which represents, or is substantially equivalent to, the digital signal 607 received at the input of the transmitter 603.

As noted above, a transmitter and a receiver employing the techniques disclosed herein may utilize the output of the same noise source for modifying an input signal so as to either generate a power spread representation of the input signal (as with a transmitter or encoder) or to recover the original digital signal from a power spread representation (as with a receiver or decoder). This has the advantages of the ease of implementing a single noise source and the assurance that the modifying signal used by the transmitter and the modifying signal used by the receiver are usually the same. However, in certain implementations, the use of a single noise source may be disadvantageous. For example, it will be appreciated that an additional transmission line is needed to provide the power spreading signal to both the transmitter and the receiver. This additional transmission line itself may introduce EMI into the system. Moreover, depending on the length of the transmission line, the skew in the power spreading signal occurring at the receiver may be unwieldy or unacceptable.

Accordingly, in one embodiment, the transmitter 603 and the receiver 604 implement separate noise sources. As illustrated, the transmitter 603 may comprise a noise source 609 to provide a power spreading signal 610 to a signal modification module 611 of the transmitter 603, whereby the signal modification module 611 modifies the input data signal 607 using the power spreading signal 610. The receiver 604 comprises a separate noise source 612 to provide a power spreading signal 613 to a signal modification module 614 of the receiver 604, whereby the signal modification module 614 modifies the data signal received via the transmission line 605 using the power spreading signal 613. The signal modification modules 611 and 614 typically are implemented as XOR gates.

In order for the receiver 604 to recover a digital signal 608 that is substantially equivalent to the digital signal 607 received by the transceiver 603, the power spreading signals 610 and 613 provided by the noise sources 609 and 612, respectively, preferably are substantially equivalent. Accordingly, the noise sources 609 and 612 preferably are of similar implementation. Moreover, an initialization module 615 may provide the same seed value to each noise source 609 and 612 in instances where the noise sources 609 and 612 are initialized with a seed value. In the illustrated example, the circuit device 600 may implement a single initialization module 615 to provide the seed input and/or other initialization input to both noise sources 609 and 612, or separate initialization modules 615 may be implemented for both the transmitter 603 and the receiver 604.

FIGS. 16-20 illustrate various exemplary noise sources in accordance with at least one embodiment of the present disclosure. As noted above, the noise sources disclosed herein may implement any of a variety of power spreading signal generators, or combination thereof, without departing from the scope or the spirit of the present disclosure. Although FIGS. 16-20 illustrate a number of additional noise source implementations, those skilled in the art may utilize other noise sources using the guidelines provided herein.

Figure 16:
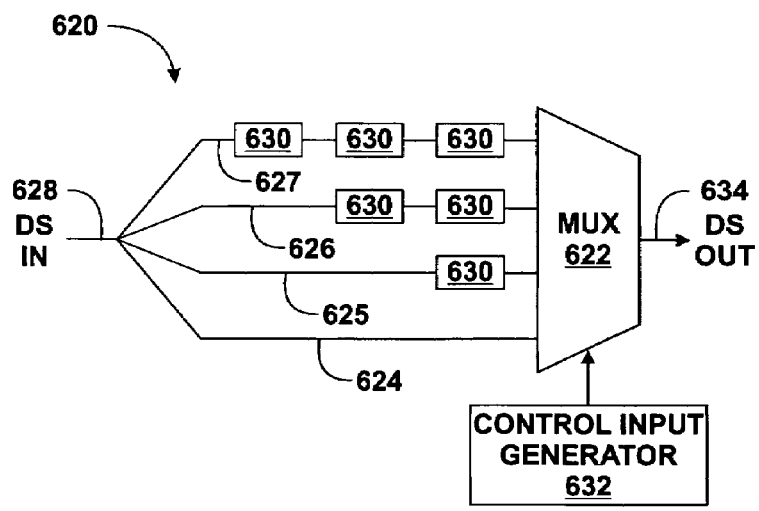
FIGS. 16 and 17 are block diagrams illustrating a module for introducing random delay into a digital signal according to at least one embodiment of the present disclosure.
Figure 17:
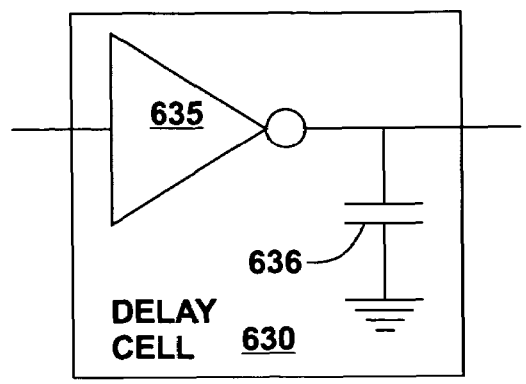

FIGS. 16 and 17 illustrate an exemplary noise source 620 comprising a multiplexer 622 or other input selector having a plurality of inputs operably coupled to a corresponding plurality of delay paths (delay paths 624-627 in the illustrated example). As depicted in FIG. 16, each delay path comprises an input to receive an input digital signal 628 and at least a subset of the delay paths comprise varying numbers of delay cells, each delay cell providing a small delay between its input and its output. For example, the delay paths 624-627 comprise zero, one, two and three delay cells 630, respectively. Accordingly, each delay path 624-627 outputs to the multiplexer 622 the same signal but time shifted with respect to the signals output by the other delay paths.

The noise source 620 further comprises a control input generator 632 having an output coupled to a control input of the multiplexer 622, wherein the multiplexer 622 selects one of its inputs for provision to its output based on the control input. The control input generator 632, in one embodiment, comprises a random number generator, a pseudo-random number generator or a polynomial sequence generator to provide a random number, pseudo-random number or polynomial sequence to the control input of the multiplexer 622. Accordingly, in operation, the control input generator 632 periodically provides, for example, a random number to the multiplexer 622, which causes the multiplexer 622 to randomly select the output of one of the delay paths 624-627 for output from the multiplexer 622. Accordingly, the digital signal 628 may be modified by introducing random delays, resulting in a modified digital signal 634 having its power spread compared to the digital signal 628.

At the receiving end, a noise source substantially similar to noise source 620 may be used to recover a substantially similar representation of the input data signal 628. In this instance, the noise source at the receiver preferably implements the same delay paths 624-627 and control input generator 632 as the transmitting side so that the modifications to the data signal 628 made at the transmitter are effectively removed by the receiver.

FIG. 17 illustrates an exemplary implementation of the delay cells 630. In one embodiment, the delay cells 630 each comprise an inverter 635 having an input operably coupled to the input of the delay cell 630 and an output operably coupled to the output of the delay cell. The delay cell 630 further may comprise a capacitor 636 having one electrode coupled to the output of the delay cell 630 and another electrode coupled to a voltage reference (e.g., ground). As will be appreciated, the inverter 635 introduces a delay between its input and its inverted output. Because the inverter inverts the input signal, it will be appreciated that it may be advantageous to use even numbers of delay cells on each delay path so that a non-inverted, delayed representation of the input digital signal 628 may be output to the multiplexer 622.

Figure 18:
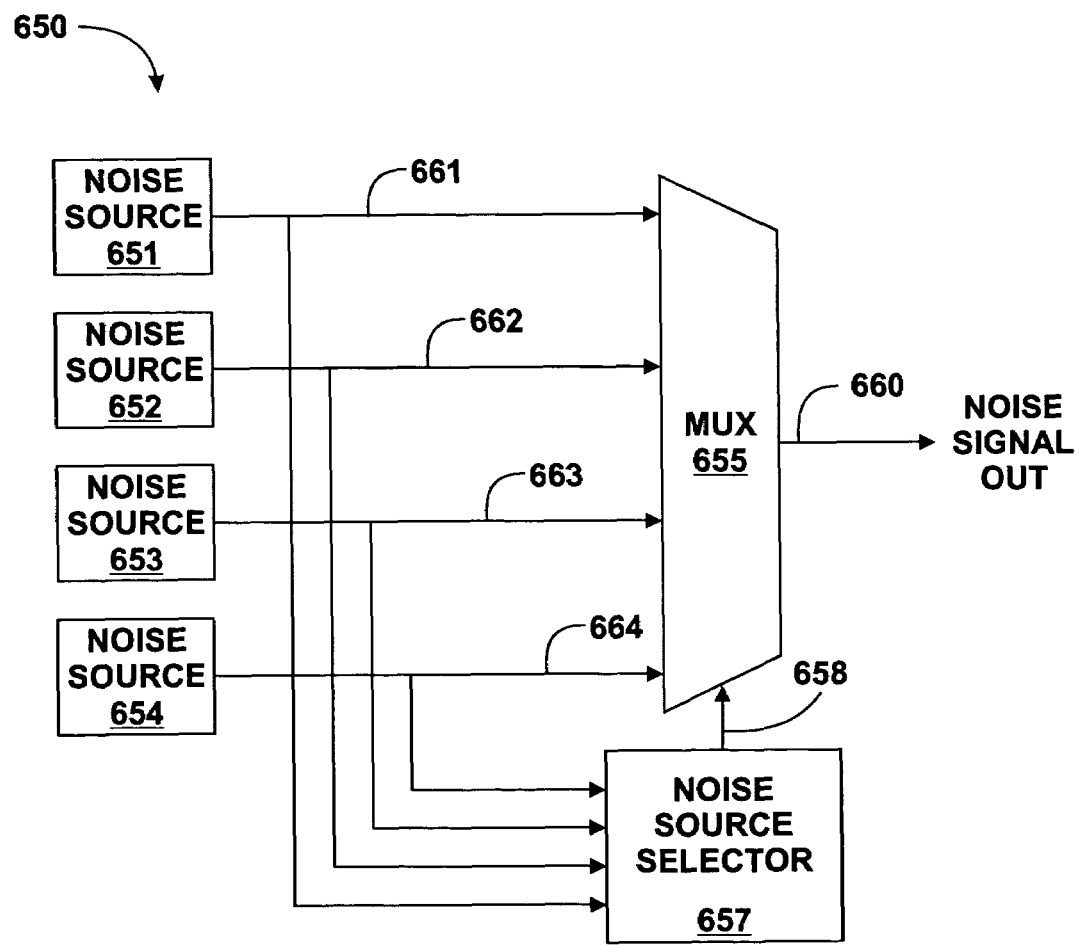
FIGS. 18 and 20 are block diagrams illustrating exemplary implementations of noise sources according to at least one embodiment of the present disclosure.
Figure 19:
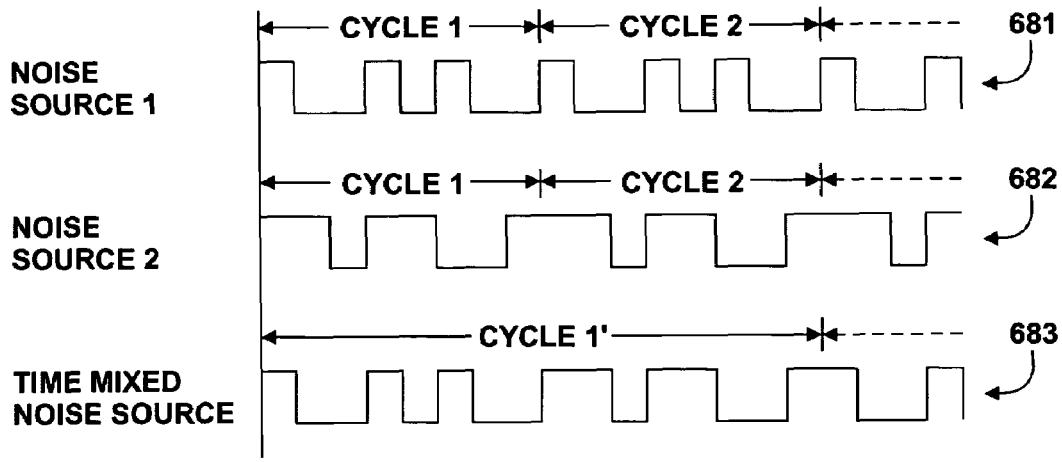
FIG. 19 is a waveform diagram illustrating an operation of the noise source of FIG. 18 according to at least one embodiment of the present disclosure.

FIGS. 18 and 19 illustrate another exemplary noise source 650 in accordance with at least one embodiment of the present disclosure. As illustrated, the noise source 650 comprises a plurality of noise sources 651-654, each having an output to provide a power spreading digital noise signal (power spreading signals 661-664, respectively). The noise sources 651-654 may comprise any of a variety of noise sources, or combinations thereof, such as, for example, a pseudo-random noise generator (e.g., an LFSR), a random noise generator (e.g., a quadratic code residue sequence generator), a polynomial sequence generator, and the like. The noise source 650 further comprises a multiplexer 655 having a plurality of inputs operably coupled to the outputs of the noise sources 651-654 to receive the power spreading signals 661-664 and an output to provide one of the input power spreading signals as an output signal 660. The noise source 650 also comprises a noise source selector 657 to provide a control signal 658 to the multiplexer 655, whereby the multiplexer 655 selects one of the inputs based on the control signal 658.

In one embodiment, the noise source selector 657 provides the control signal 658 so as to time multiplex some or all of the power spreading signals 661-644 to generate an output power spreading signal 660 having a sequence of time portions of some or all of the power spreading signals 661-644. Accordingly, the noise source selector 657 may include a timer or counter so as to select each of the power spreading signals 661-664 for a predetermined period. In instances where the noise sources 651-654 have a finite number of states (such as with LFSRs) so that the power spreading signals 661-664 are repeating sequences, the noise source selector 657 may select each power spreading signal 661-664 in turn such that some or all of the states are represented in the output power spreading signal 660 before the next power spreading signal from a different noise source is selected by the multiplexer 655 for output. In order for a receiver to accurately recover the digital signal modified using the output power spreading signal 660 of the noise source 650, the receiver preferably implements a substantially similar noise source 650.

One advantage to time multiplexing multiple power spreading signals is that the periodicity of harmonics in the output power spreading signal 660 may be increased compared to the use of a single noise source having a repeating sequence. To illustrate, FIG. 19 depicts a timing diagram of two separate noise sources (waveforms 681 and 682, respectively) and a time-multiplexed combination of the two noise sources (waveform 683) as may be implemented by the noise source 650 of FIG. 18. Assuming that the two noise sources have the same number of states (e.g., eight states), the sequence output by the noise sources will repeat every eight clock cycles (cycles 1 and 2). Accordingly, each of the two noise sources has a periodicity of eight clock cycles. Assuming a 100 MHz clock, each of these noise sources would have an underlying frequency at 12.5 MHz.

However, by time multiplexing multiple power spreading signals, the periodicity of the resulting signal may be increased, thereby lowering the underlying frequency of the output signal. As illustrated, if the signals of the two noise sources were to be combined such that the entire sequence of the first noise source was output, followed by the output of the entire sequence of the second noise source, followed again by the output of the entire sequence of the first noise source, and so on, the number of cycles before the time multiplexed output signal (waveform 683) repeated itself (i.e., its periodicity) would be doubled to 16 clock cycles in the illustrated example (cycle 1'). Accordingly, the underlying frequency of the time multiplexed output signal would be only 6.25 MHz.

Figure 20:
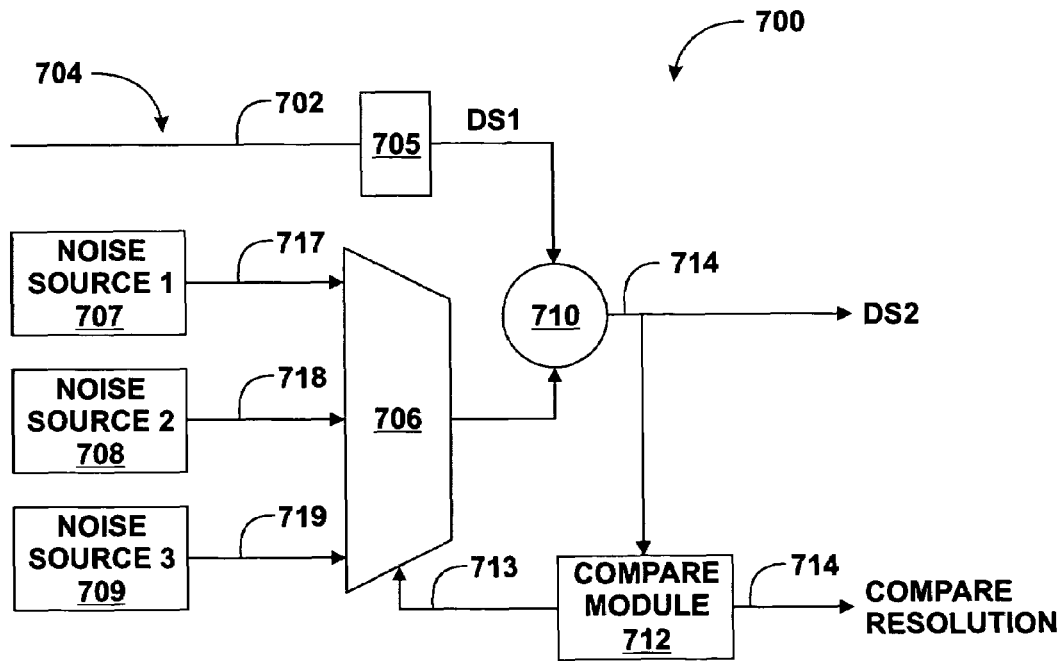

FIG. 20 illustrates an exemplary technique for identifying a noise source used to modify or encode a digital signal in accordance with at least one embodiment of the present disclosure. As discussed in detail herein, any of a variety of noise sources may be implemented by a transmitter or encoder to modify a digital signal so as to reduce its EMI characteristics when transmitted via a transmission line. As noted above, in at least one embodiment, the encoding at a transmitter and the decoding at a receiver are reflective in that the original data signal may be recovered from an encoded data signal by using the same or substantially similar power spreading signal to decode the encoded signal as was used to encode the original digital signal. Accordingly, it typically is desirable for the receiver or decoder to utilize the same spreading signal used by the transmitter or encoder to decode an encoded signal. However, in certain instances, the receiver may be unable to determine the characteristics of the noise source (e.g., type, seed value, number of states, etc.) used by the transmitter to encode the digital signal. Accordingly, FIG. 20 depicts a noise source detection module 700 to identify the noise source used by a transmitter to encode an encoded digital signal 702 received via, e.g., a transmission line 704.

The noise source detection module 700 comprises an input port 705, a multiplexer 706, a plurality of noise sources 707-709, a signal modification module 710 and a compare module 712. The input port 705 comprises an input operably coupled to the transmission line 704 to receive the encoded digital signal 704 and an output to provide the encoded digital signal 704 to an input of the signal modification module 710. The multiplexer 706 comprises a plurality of inputs operably coupled to outputs of the noise sources 707-709 to receive power spreading signals 717-719 and an output to provide a selected one of the power spreading signals 717-719 to a second input of the signal modification module 710. The noise sources 707-709, in one embodiment, are replicates of one or more noise sources expected to be used by a transmitter that provides the encoded digital signal 702. The compare module 712 comprises an input operably coupled to an output of the signal modification module 710 (typically implemented as an XOR gate) and an output to provide a control signal 713 to the multiplexer 706, wherein the multiplexer 706 selects one of the power spreading signals 717-719 based on the control signal 713.

In operation, the compare module 712 directs the multiplexer 706 to select one of the power spreading signals 717-719 for output to the signal modification module 710. Using the output from the multiplexer 706, the signal modification module 710 modifies the encoded digital signal 702 to generate a modified representation 714 of the encoded digital signal 702. The compare module 712 analyzes the modified representation 714 to determine if it represents a recovered digital signal. If so, the compare module 712 is considered to have identified the noise source used at the transmitter, so the compare module 712 continues to operate the multiplexer 706 so that the selected power spreading signal is provided to the signal modification module 710 to decode the encoded digital signal 702.

If the compare module 712 determines that the modified representation 714 does not represent a recovered digital signal, the compare module 712 directs the multiplexer 706 to select another power spreading signal. The signal modification module 710 modifies the encoded digital signal 702 using the newly selected power spreading signal, and again the compare module 712 determines if the resulting modified representation 714 represents a recovered digital signal. In this manner, each of the noise sources 707-709 may be tested to determine whether it is the same or substantially similar as the noise source used by the transmitter to encode the encoded digital signal 702.

The compare module 712 may determine whether the modified representation 714 represents a decoded digital signal in any of a variety of ways. For example, each of the noise sources 707-709 may implement a different entry state or exit state when entering or exiting a spread mode. A state machine therefore may implemented to identify which entry/exit state occurs in the modified representation 714, and if so identified, deduce that the representation 714 is a decoded digital signal.

In one embodiment, the compare module 712 further may comprise a second output to provide an indication of the results of the analysis of the modified representation 714. This output may be used, for example, to prevent the modified representation 714 from being provided to other components of the receiving device when the modified representation 714 is not representative of a recovered digital signal.

The techniques described herein are not limited to the transmission of a digital signal along a single transmission line. In many instances, reduced EMI may be achieved on parallel transmission lines. FIGS. 21-24 illustrate various exemplary techniques for parallel transmission of reduced EMI digital signals.

Figure 21:
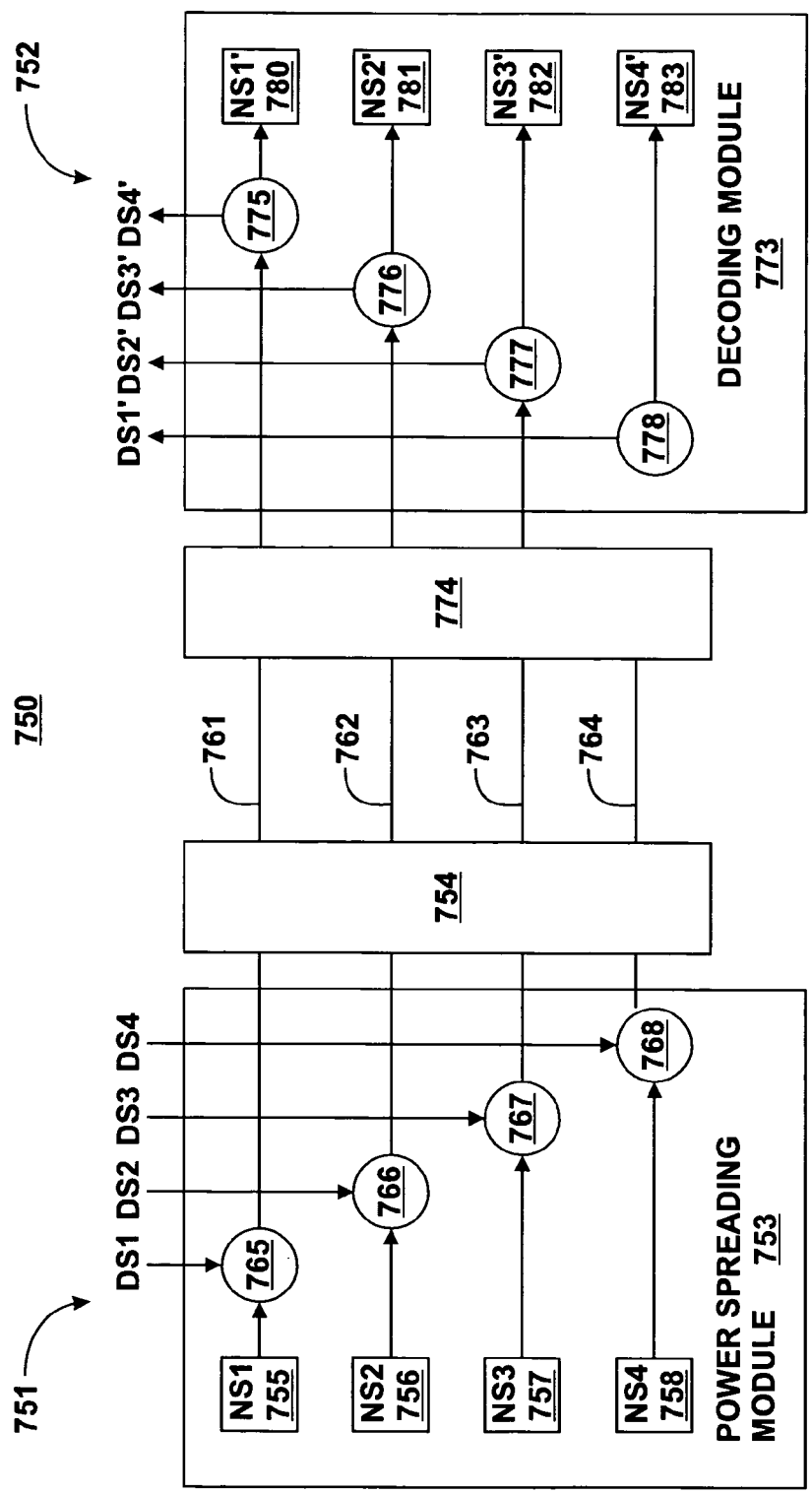
FIGS. 21-23 are block diagrams illustrating a parallel transmission of multiple power spread digital signals according to at least one embodiment of the present disclosure.

FIG. 21 illustrates an exemplary system 750 whereby each of a plurality of digital signals are modified by a power spreading signal and transmitted over a separate transmission line. The system 750 comprises a transmitter 751 (i.e., an encoder) operably coupled to a receiver 752 (i.e., a decoder) via a plurality of transmission lines 761-764, where the plurality of transmission lines 761-764 may be implemented as, for example, a bus. The transmitter 751 comprises a power spreading module 753 having a plurality of inputs to receive a plurality of digital signals DS1-DS4 and a plurality of outputs operably coupled to the inputs of a transmission line interface 754. The transmission line interface 754, in turn, has a plurality of outputs, each output operably coupled to one of the transmission lines 761-764. The power spreading module 753, in one embodiment, comprises one or more noise sources 755-758 to provide one or more power spreading signals and a plurality of signal modification modules 765-768 (typically implemented as XOR gates), each having a first input coupled to receive a power spreading signal from one of the noise sources 755-758 and a second input to receive a respective one of the digital signals DS1-DS4. The signal modification modules 765-768 modify the corresponding digital signal using the input power spreading signal and provide the modified digital signal to the transmission line interface 754 for transmission via the corresponding transmission line.

In one embodiment, each of the digital signals DS1-DS4 is modified using a different power spreading signal. In another embodiment, one or more of the digital signals DS1-DS4 may be modified using the same power spreading signal. The former implementation has the benefit of reducing overall EMI produced by the transmission of the digital signals DS1-DS4, whereas the latter implementation has the benefit of reducing the number of noise sources to be implemented at the transmitter.

As with the transmitter 751, the receiver 752 comprises a transmission line interface 774 having a plurality of inputs, each input operably coupled to a respective one of the transmission lines 761-764, and a plurality of outputs. The receiver 752 further comprises a decoding module 773 having a plurality of signal modification modules 775-778, each having a first input operably coupled to an output of the transmission line interface 774 to receive a corresponding encoded digital signal and a second input to receive a power spreading signal from one of noise sources 780-783. The signal modification modules 775-778 each modify their received encoded digital signal using the input power spreading signal to generate decoded digital signals DS1'-DS4' which represent digital signals DS1-DS4 prior to their encoding. As the signal modification process between the transmitter 751 and the receiver 752 preferably is reflective, the power spreading signals provided to the signal modification modules 775-778 preferably are the same or substantially similar to the power spreading signals used by the counterpart signal modification modules 765-768 of the transmitter 751.

Although FIG. 21 depicts a one-to-one correspondence between noise sources and transmission lines, it will be appreciated that two or more of the digital signals DS1-DS4 may be modified using the same power spreading signal. Alternatively, one or more of the digital signals DS1-DS4 may be transmitted in an unmodified form. Control input, in the form of input via, for example, an I/O pin, a bios setting, a register, and the like, may be used to determine which digital signals are to be modified and by which power signal.

Figure 22:
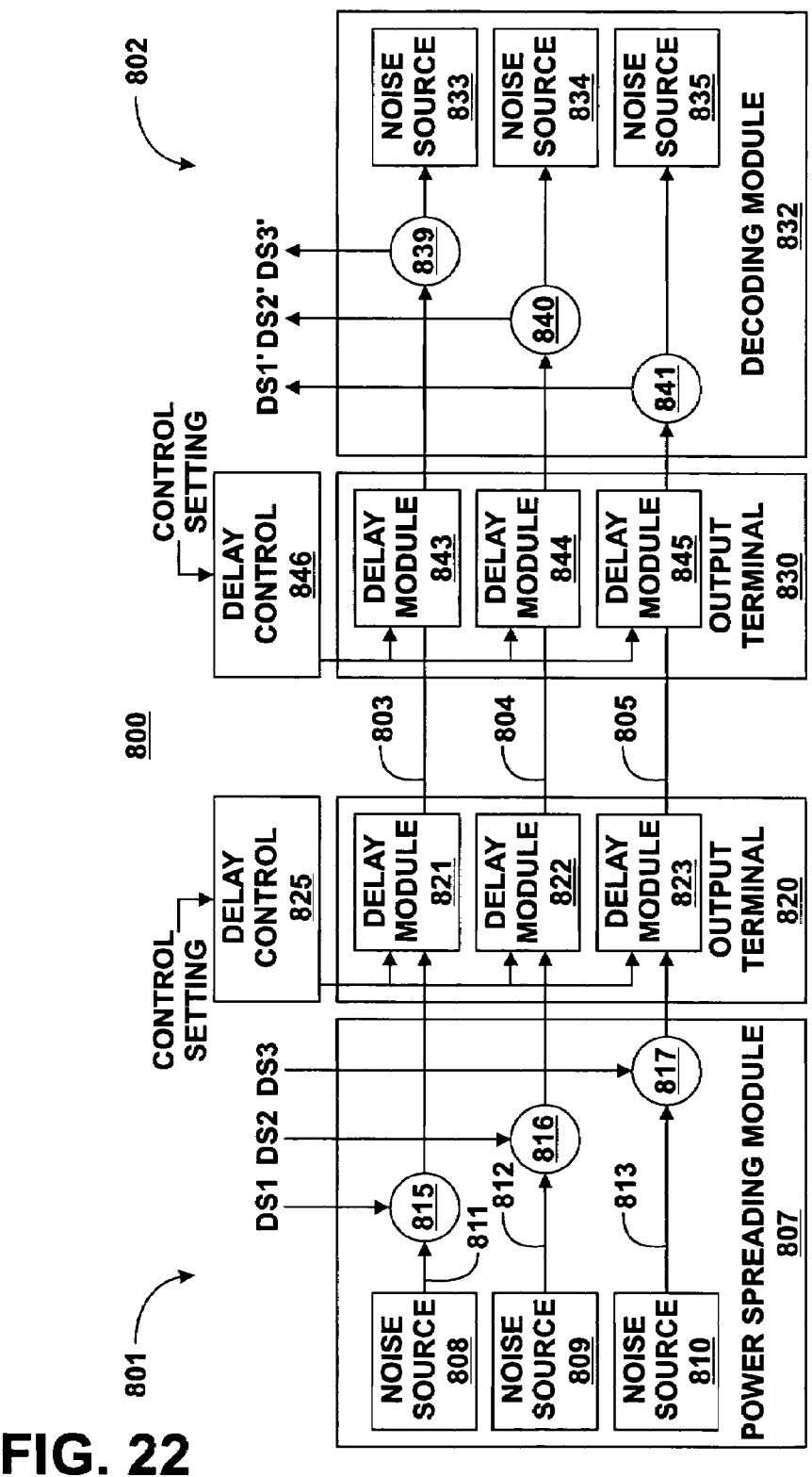
Figure 23:
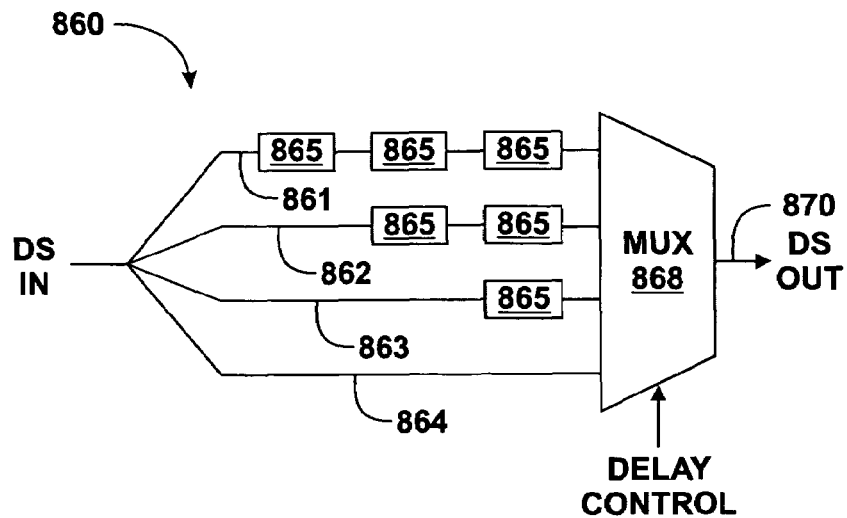
Figure 24:
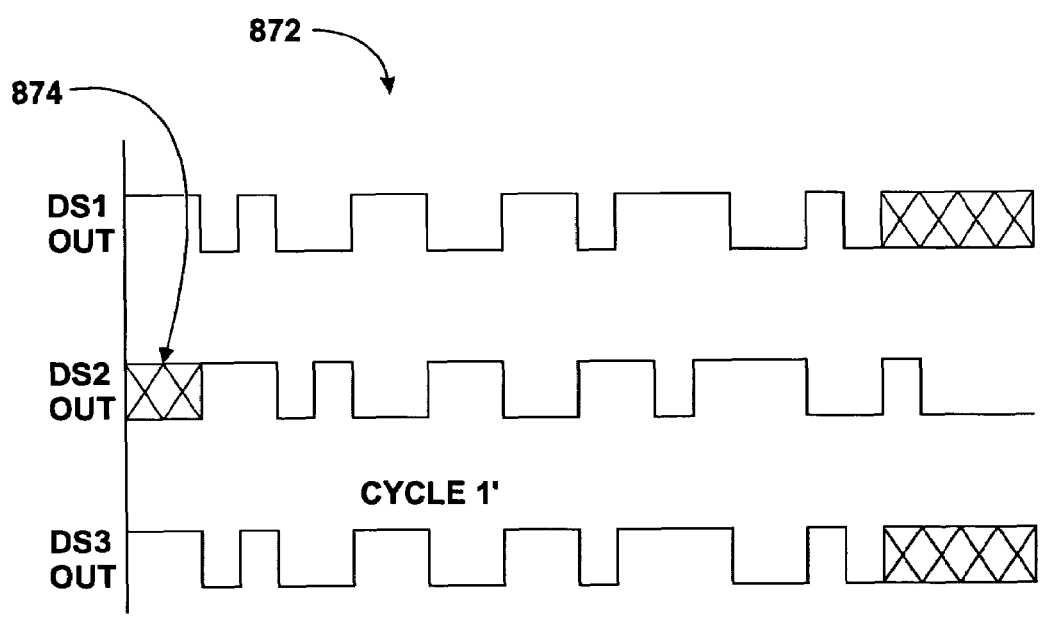
FIG. 24 is a waveform diagram illustrating an operation of the system of FIG. 21 according to at least one embodiment of the present disclosure.

FIGS. 22-24 depict a system 800 whereby digital signals may be delayed relative to each other so as to reduce EMI. The system 800 of FIG. 22 comprises a transmitter 801 coupled to a receiver 802 via a plurality of transmission lines 803-805. The transmitter 801 comprises a power spreading module 807 having a plurality of inputs to receive a plurality of digital signals DS1-DS3 and a plurality of noise sources 808-810 having outputs to provide power spreading signals 811-813, respectively. The power spreading module 807 further includes a plurality of signal modification modules 815-817, each having an input to receive one of the digital signals DS1-DS3 and an input to receive one of the power spreading signals 811-813, and an output to provide an encoded digital signal. The transmitter 801 further comprises an output terminal 820 having a plurality of delay modules 821-823, each delay module having an input operably coupled to a corresponding output of one of the signal modification modules 815-817 to receive an encoded digital signal and an output operably coupled to one of the transmission lines 803-805 to provide the encoded digital signal to the transmission line after a delay determined based on input from a delay control module 825.

Similarly, the receiver 802 comprises an input terminal 830 having a plurality of inputs coupled to the transmission lines 803-805 to receive the encoded digital signals and a plurality of outputs to provide the encoded digital signals. The receiver 802 further comprises a decoding module 832 having a plurality of noise sources 833-835 having outputs to provide power spreading signals 836-838, respectively, and a plurality of signal modification modules 839-841, each signal modification module having an input to receive a power spreading signal, an input to receive an encoded digital signal from the input terminal 830 and an output to provide digital signals DS1'-DS3' which represent the encoded digital signals modified using the input spreading signals. In at least one embodiment, each of the power spreading signals 836-838 is the same or substantially similar to its counterpart of the power spreading signals 811-813 so that the digital signals DS1'-DS3' are representative of the digital signals DS1-DS3.

As noted above, the output terminal 820 of the transmitter 801 may comprise delay modules 821-823 to delay the provision of one or more of the encoded digital signals to the transmission lines 803-805. As discussed in greater detail below, the delay introduced into each signal may vary from signal to signal. Accordingly, without adjusting for this variance in delay, the digital signals DS1'-DS3' may not be time-aligned. In certain instances, this misalignment may have little or no consequence for the components using the digital signals DS1'-DS3'. However, in other instances, such as when the power spreading signals 836-838 are time aligned with their counterpart signals 811-813, it may be desirable to realign the received encoded digital signals prior to their modification by the signal modification modules 839-841. Accordingly, in one embodiment, the input terminal 830 comprises a plurality of delay modules 843-845, each having an input operably coupled to one of the transmission lines 803-805 and an output operably coupled to one of the signal modification modules 839-841 to provide a delayed representation of the encoded digital signal received via the transmission line, where the amount of delay may be based on, for example, input received from a delay control module 846, which may the same as, or separate from, the delay control module 825 of the transmitter 801. Alternatively, delay modules may be coupled to the outputs of the signal modification modules 839-841 to time align the signals DS1'-DS3' after modification by the signal modification modules 839-841.

FIG. 23 illustrates an exemplary delay module 860 which may be implemented by the system 800. The delay module 860 comprises a plurality of delay paths 861-864, each of at least a subset of the delay paths having one or more delay cells 865 (analogous to delay cells 630, FIGS. 16 and 17) to introduce a delay into the input digital signal as it is transmitted from the input of the delay path to the output of the delay path. As illustrated, the delay paths 861-864 preferably have varying numbers of delay cells, resulting in a variance in the amount of delay introduced into the input digital signal along each path.

The delay module 860 further comprises a multiplexer 868 having a plurality of inputs, each input operably coupled to the output of one of the delay paths 861-864, and an output to provide the signal received at one of the selected inputs, wherein the selected input is selected based on a delay control signal received from, for example, one of the delay control modules 825 or 846. Thus, the multiplexer 868 receives a plurality of representations of the input digital signal, each representation having a different amount of delay in comparison to the other representation. From these inputs, a representation having a desired delay may be selected using the delay control input and provided by the output of the multiplexer 868 as a delayed digital signal 870.

In operation, the delay control 825 may set one or more of the delay modules 821-823 so that they introduce some amount of delay into the encoded digital signals output by one or more of the signal modification modules 815-817 before they are transmitted in parallel over the transmission lines 803-805. This delay often results in a reduced EMI characteristic when compared to the transmission of the same encoded signals transmitted in parallel without delay. This is particularly true when the same encoded signal is transmitted in parallel over two or more transmission lines. By adjusting the alignment of these signals, the overall EMI characteristic may be reduced by reducing the likelihood that the parallel signals transition at the same times.

FIG. 24 illustrates a waveform diagram depicting an exemplary operation of the system 800. For ease of discussion, it is assumed that the digital signals DS1-DS3 are the same signal and are modified by the same power spreading signal, but are transmitted separately and in parallel over the transmission lines 803-805. It will be appreciated that, in the absence of a delay in one or more of the digital signals DS1-DS3 of this example, the overall EMI emitted by the transmission lines 803-805 would be approximately three times the EMI emitted by any one of the transmission lines 803-805 alone because the digital signals DS1-DS3 transition at the same times and in the same way. However, if a delay 874 is introduced in, for example, the digital signal DS2 transmitted via the transmission line 804, the number of the same type of transitions occurring at the same time in both the digital signal DS1 and the digital signal DS2 likely is reduced, thereby reducing the EMI emitted by the combination of the digital signals DS1 and DS2. A similar reduced EMI characteristic may be achieved between the digital signals DS1 and DS3 when the digital signal DS2 is delayed relative to the digital signal DS3.

Moreover, depending on certain characteristics, such as the proximity of the transmission lines 803-805 to each other, the same delay may be implemented on alternating transmission lines. For example, assuming that transmission line 804 is disposed between transmission lines 803 and 805, the signals DS1 and DS3 transmitted by the transmission lines 803 and 805, respectively, may implement the same delay, whereas the digital signal DS2 transmitted by the transmission line 804 may implement a different delay so as to offset the digital signal DS2 from the digital signals DS1 and DS3, whereas an offset between digital signals DS1 and DS3 may be of less concern due to their relative distance between the transmission lines 803 and 805.

In another embodiment, the delay control 825 may control a noise source (not shown) that is provided to both the transmitter and the receiver. In this instance, the delay control 825 may control the output of the noise source so as to introduce a temporal shift in the noise source. Accordingly, the delay control 825 in this instance may be implemented as a shift register having taps that feed the outputs to the transmitter and receiver.

As described in detail above, the digital signals transmitted between a transmitter and a receiver may represent a digital clock signal to which a PLL or other clock synchronization device is synchronized. In a number of instances, the transmitted digital signal may transition from representing an unmodified digital clock signal (referred to herein as the "normal mode") to representing a modified or encoded digital clock signal (referred to herein as the "XEMI mode"), or vice versa. FIGS. 25-28 illustrate an exemplary technique for identifying these transitions so as to properly synchronize a PLL or other clock synchronization device accordingly. As described in detail below, in one embodiment, after a phase lock is achieved with a non-spread clock, a timeout occurs which controls the transition to XEMI mode. The entry mode is made such that the most significant bit of the encoder of the transmitter is overridden so that a pattern that does not exist within the normal "states" of the noise source is created. This pattern facilitates the entry into XEMI mode in a predictable way so that if an impulse noise event, either on the transmission line or some noise inside the receiver, causes a mis-sample of the input clock to the receiver, a false entry into XEMI mode is precluded. If a mis-sample occurs without this feature, i.e., a noise event occurs which causes a clock edge to move in time (i.e., forward or reverse with respect to the normal edge placement of a clock with X amount of jitter) then the clock sampling circuit inside the receiver may perceive this as an "entry" into the XEMI mode, and start its noise source. At this point, the receiver clock typically is no longer locked to the incoming signal and the system may operate erroneously as a result. By using a particular pattern (such as holding the clock to a "1" state or a "0" state for several clock cycles), the receiver may ascertain that the transmitter is entering the XEMI mode. Accordingly, the first clock (which is out of phase because the receiver noise source would not yet be turned on) is suppressed with respect to the input to the phase frequency detector on a PLL to prevent the PLL from losing lock. Since this occurs only once upon entry and exit to the XEMI mode, there typically is minimal jitter impact for one clock, and because the system has not yet exited the power on reset state, no unexpected operations of the system are expected. One reason for the use of a unique state is that there typically is no control of whether multiple error events occur in the transmission of the clock and it therefore may be possible, though improbable, to cause a condition such that the receiver erroneously think multiple entry exits are occurring in the system.

Figure 25:
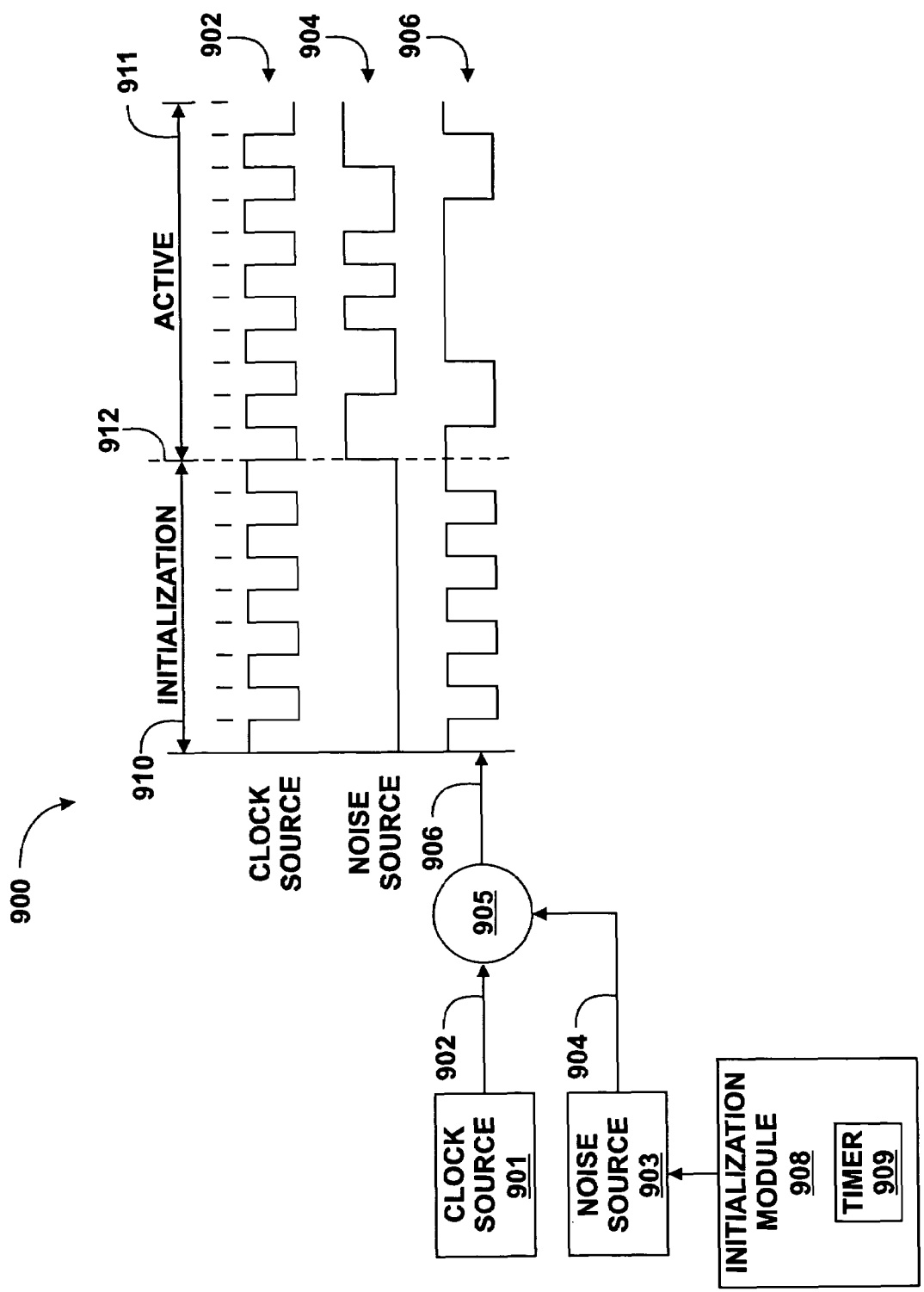
FIGS. 25-28 are block diagram illustrating an initialization process according to at least one embodiment of the present disclosure.

FIG. 25 illustrates a transmitter 900 having a clock source 901 having an output to provide a digital clock signal 902, a noise source 903 to provide a power spreading signal 904 and a signal modification module 905 having an input to receive the digital clock signal 902 and an input to receive the power spreading signal 904 and an output to provide an encoded clock signal 906 that represents the digital clock signal 902 modified using the power spreading signal 904. The transmitter 900 further comprises an initialization module 908 having an output operably coupled to the noise source 903 to control the operation of the noise source 903.

As will be appreciated by those skilled in the art, a number of clock cycles typically are required before a PLL is synchronized to a clock signal and is stable. Thus, the immediate transition from an unmodified clock signal to a modified clock signal by the transmitter 900 after, for example, power up may cause the PLL at a receiver to fail to properly lock to the clock signal or may cause an unstable lock by the PLL. Accordingly, in at least one embodiment, the initialization module 908 provides a control signal to the noise source 903 to maintain the noise source 903 in an initialization state during an initialization stage 910. During this initialization stage 910, the output of the noise source 904 preferably is held at a constant logic value (e.g., logic value "zero") so that the clock signal 902 is output in unmodified form as clock signal 906. Thus, a receiver receiving the clock signal 906 may synchronize its PLL to the clock signal 906, which during the initialization period 910 represents the unmodified clock signal 902.

After the initialization period 910, the PLL of the receiver is expected to be synchronized to the unmodified clock signal 902 and stable. The initialization module 908 may time the initialization period using a timer or counter 909 to measure the number of clock cycles or elapsed time. At the end of the initialization period, the initialization module 908 directs the noise source 903 to transition to an active state 911 (transition 912) whereby the noise source 903 outputs a non-constant power spreading signal, such as a pseudo-random signal, a random signal, a polynomial sequence, and the like. As a result, the clock signal 905 is modified by the now non-constant output of the noise source 904 to produce the encoded clock signal 906. As discussed below with reference to FIGS. 26 and 27, the receiver, in one embodiment, detects the transition 912 of the clock signal 906 from a unmodified clock signal to an encoded clock signal, initializes and starts its noise source, and decodes the encoded clock signal accordingly.

Figure 26:
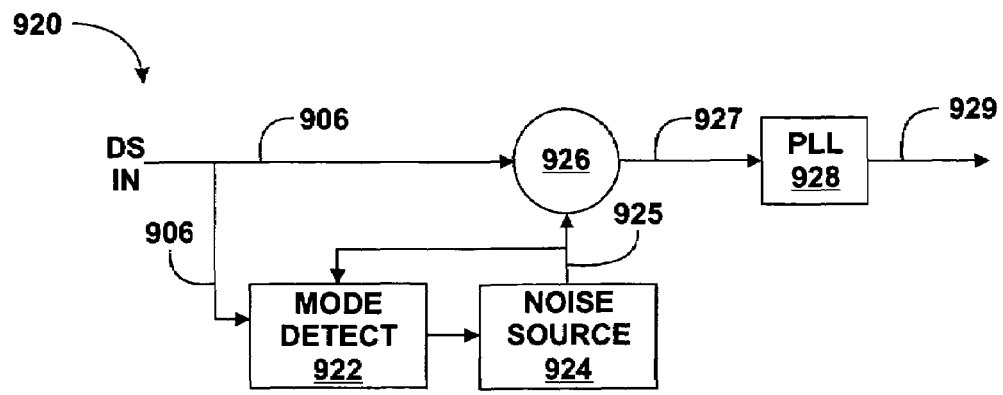
Figure 27:
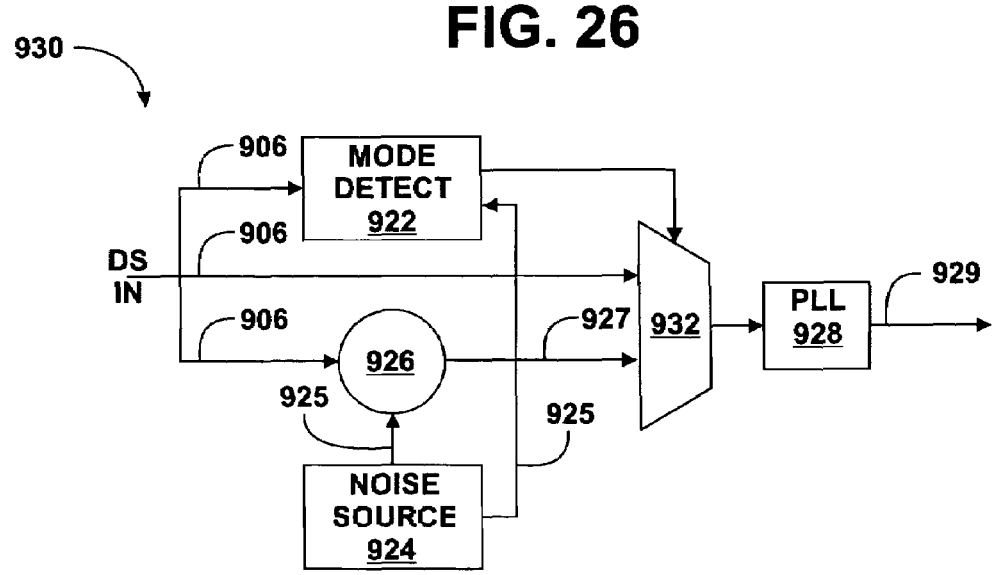

FIGS. 26 and 27 illustrate various exemplary implementations of a receiver to detect the transition 912 of the clock signal 906 (FIG. 25) and synchronize a PLL accordingly. The receiver 920 of FIG. 26 comprises a mode detect module 922 having an input to receive the clock signal 906 via a transmission line and an output to provide control and configuration information, a noise source 924 having an input to receive the control and configuration information and an output to provide a power spreading signal 925, and a signal modification module 926 having an input to receive the clock signal 906, an input to receive the power spreading signal 925 and an output to provide a decoded clock signal 927. The receiver 920 further comprises a PLL 928 having an input to receive the decoded clock signal 927 and an output to provide a clock signal 929 synchronized to the clock signal 927.

In at least one embodiment, the mode detect module 922 is operable to detect the transition 912 of the clock signal 906 from an unmodified clock signal to an encoded clock signal. Prior to this transition, the mode detect module 922 may maintain the noise source 924 in an initialization state whereby the power spreading signal 925 is a constant logic value so that the clock signal 906 is output in unmodified form by the signal modification module 926 as the clock signal 927. The PLL 928 thereby synchronizes to the clock signal 927, thereby effectively synchronizing to the clock signal 906, which represents the clock signal 902 (FIG. 25) during the initialization state. Subsequent to the transition 912, the mode detect module 922 may initialize the noise source 924 and direct the noise source 924 to enter an active state whereby a non-constant power spreading signal 925 is output to the signal modification module 926. As a result, the encoded clock signal 906 is decoded using the non-constant power spreading signal 925 to generate the clock signal 927 which is representative of the clock signal 902 prior to encoding during the active state.

FIG. 27 illustrates a similar receiver 930 having the mode detect module 922, noise source 924, signal modification module 926 and PLL 928. However, rather than controlling the noise source 924 directly, in one embodiment, the mode detect module 922 provides a control signal to a multiplexer 932, which has as inputs the clock signal 906 and the clock signal 927 and has an output coupled to the input of the PLL 928. Based on whether the mode detect module 922 detects that the clock signal 906 is in normal mode or XEMI mode, the mode detector module 922 directs the multiplexer 932 to select one of the clock signals 906 or 927 for output to the PLL. When in normal mode, the clock signal 906 represents the clock signal 902 in unmodified form and because the noise source 924 is not directly controlled by the mode detector module 922 in this example, the clock signal 927 output by the signal modification module 926 may not represent the clock signal 902, so the multiplexer 932 is operated to output the clock signal 906. Conversely, when in XEMI mode, the clock signal 906 represents an encoded version of the clock signal 902, whereas the clock signal 927 represents a decoded version of the clock signal 902, so the multiplexer is operated to provide the clock signal 927 for output to the PLL 928. The mode detect module 922 may detect the transition in any of a variety of ways. For example, the mode detect module 922 may implement a state machine whereby a specific pattern representing the transition is detected and thus indicates that the transition is occurring.

Figure 28:
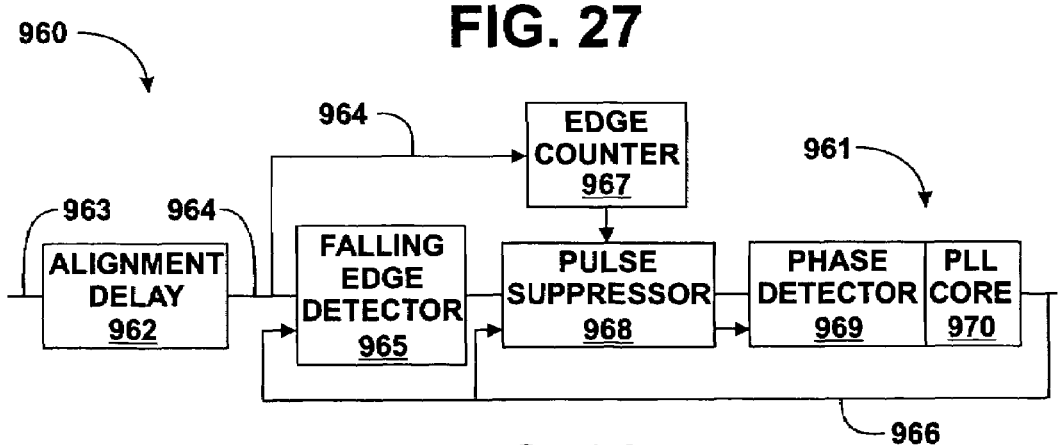

Referring to FIG. 28, a technique for maintaining a PLL lock while a transmitted clock signal transitions from normal mode to XEMI mode, or vice versa is illustrated. As noted above, the receiver typically receives an input clock signal and determines whether the input clock signal is an encoded clock signal (XCLK) or an unencoded clock signal. As discussed below, the receiver may have the ability to detect the transition from normal to encoded clock signals and start its noise source to be synchronized with the transmitter's noise source. Conversely, the receiver also may have the ability to detect the transition of the input clock signal from an encoded clock signal to an unencoded clock signal, and therefore shut down or cease utilizing its noise source to decode the input clock signal.

As illustrated in FIG. 28, a PLL synchronization module 960 may be utilized by a decoder to identify the mode changes and adjust the PLL synchronization routine accordingly. The PLL synchronization module 960 comprises an alignment delay module 962 having an input to receive a reference clock signal 963 (e.g., clock signal 927 of FIG. 26) and an output to provide a delayed clock signal 964, a falling edge counter 965 having two inputs to receive the delayed clock signal 964 and a feedback signal 966 from a PLL 961 and an output, a pulse suppressor 968 having an input operably coupled to the output of the falling edge counter 965 and an output, and the PLL 961 having a phase detector 969 with an input operably coupled to the output of the pulse suppressor 968 and an input to receive the feedback signal 966 output by the PLL core 970.

In at least one embodiment, the phase detector uses the rising edges in the reference and feedback clock signals to track the phase of the clock signal. Accordingly, the transmitter eliminates some of the redundant falling edges in the source clock and uses both the falling and rising edges in the encoded clock signal to convey phase of the clock signal. The receiver therefore reinserts the falling edges in the received signal so that the phase detector uses the correct transitions to track the phase of the remote clock source.

The alignment delay module 962 is used to position the reference clock signal 966 so that it can be sampled reliably by the falling edge detector 965. The falling edge detector 965 samples the reference clock signal 966 to identify a missing falling edge which indicates a start of a transition between normal mode and XEM1 mode. The falling edge detector 965 may include a D-latch which captures the state of the reference clock signal 963 on the rising edge of the feedback clock signal 966. The missing falling edge typically would cause an edge mismatch on the inputs to the phase detector 969 (i.e., a falling edge occurs on the reference pin when a rising edge was expected). Because the falling edges are not used by the phase detector 969, the corresponding rising edge on the feedback clock signal 966 would cause the phase detector 969 to correct for the inverted rising edge, potentially causing the PLL 961 to go out of lock. Accordingly, the pulse suppressor 968 suppresses the rising edges on both inputs to the phase detector 969 when the absence of a falling edge is detected by the falling edge detector 965. In one embodiment, the rising edges are suppressed by only allowing the rising edges to occur during the high period of the sampling clock. The edge counter 967, in one embodiment, is used to validate the mode transition signature detected by the falling edge detector 965. The edge counter 967 ensures that the sequence detected by the falling edge detector 965 was not caused by errors in sampling the normal clock. The true transition sequence detected by the falling edge detector 965 typically is the result of a reference signal which has no transitions at the nominal falling edge.

In at least one embodiment, upon power up or initialization the PLL 961 responds to the input clock having a normal mode in a conventional manner. The PLL 961 tracks the incoming clock and eventually generates a "lock" signal to indicate that it has achieved phase and frequency lock. The lock signal, in turn, causes a charge pump (not shown) of the PLL 961 to limit the maximum current charge it can sink or source, thus minimizing any input frequency perturbation to the PLL output clock frequency. Thus, during a "throttling mode" the PLL 961 does not react to as wide a phase/frequency variation in the input clock.

Conversely, when the input clock is detected as an XEMI mode and the transition to XEMI mode is complete, the lock signal is released, thereby removing the limitations on the maximum current charge used by the charge pump and therefore allowing charge pump of the PLL to act in the conventional manner. This technique helps minimize any impulse jitter when transitioning between normal clock and XEMI reduced emission clock modes.

Figure 29:
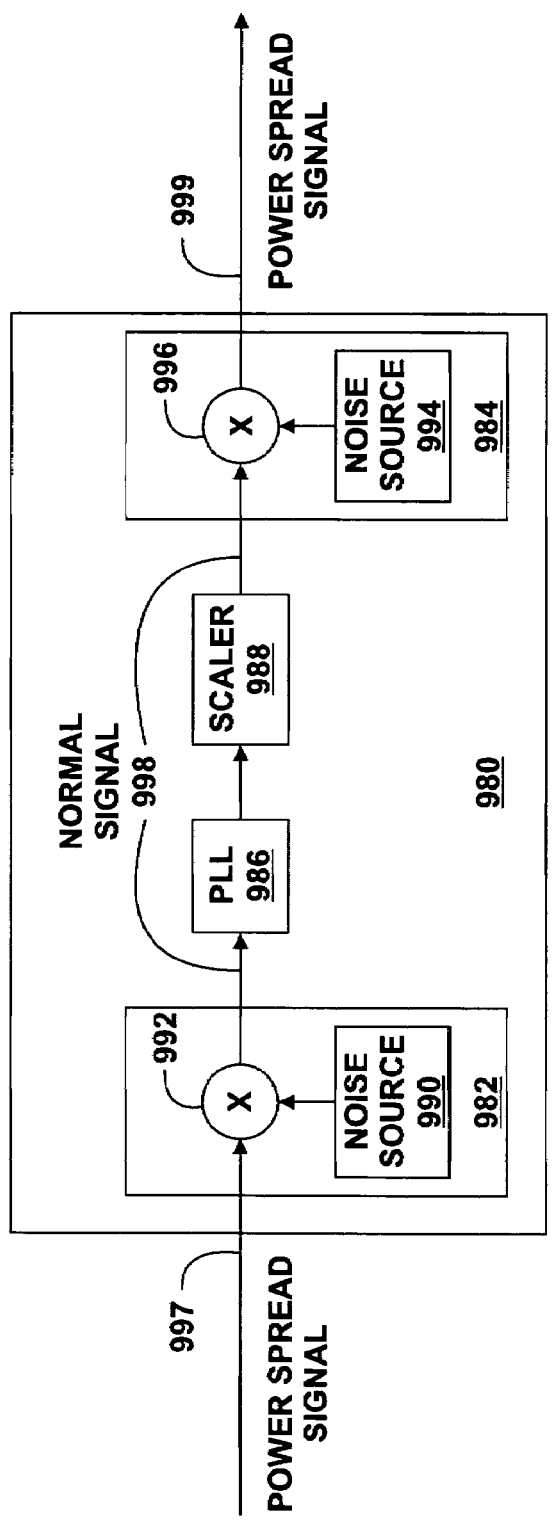
FIG. 29 is a block diagram illustrating a circuit device having a power spreading receiver and transmitter in accordance with at least one embodiment of the present disclosure.

Referring now to FIG. 29, an exemplary circuit device 980 implementing both a transmitter and a receiver is illustrated in accordance with at least one embodiment of the present disclosure. The circuit device 980 comprises an integrated circuit or a system-on-a-chip having a receiver 982 operably coupled to an input (e.g., one or more single-ended or differential pair inputs) of the circuit device 980 and a transmitter 984 operably coupled to an output of the circuit device 980 (e.g., one or more single-ended or differential pair outputs). The circuit device 980 further may comprise a PLL 986 and a scaler 988 coupled between the output of the receiver 982 and the transmitter 984. The receiver 982, in one embodiment, comprises a noise source 990 and a signal modification module 992 having an input operably coupled to the output of the noise source 990. The transmitter 984, in one embodiment, comprises a noise source 994 and a signal modification module 996 having an input operably coupled to the output of the noise source 994. Note that the noise sources 990 and 994 may comprise the same noise source or different noise sources.

In one embodiment, a power spread signal 997 is provided to the circuit device 980. Using the power spreading signal provided by the noise source 990, the signal modification module 992 modifies the power spread signal 997 to recover an unspread, or normal, signal 998, which may represent, for example, a data signal or a digital clock signal. The normal signal 998 is input to the PLL 986 and the output of the PLL 988 may be scaled to a higher or lower frequency using the scaler 988. The output of the scaler 988 is input to the signal modification module 996, whereupon it is modified using the power spreading signal provided by the noise source 994 to generate a power spread signal 999 which is output by the circuit device 980. Thus, it will be appreciated that the circuit device 980 may be utilized to scale the base frequency of a power spread signal or to change the EMI signature of a power spread signal so as to further reduce EMI or to achieve certain EMI characteristics or goals.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein.

When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

What is claimed is:

1. A method comprising:
   receiving, via a first transmission line, a first power spread signal representative of a first digital signal modified using a first power spreading digital noise signal;
   modifying the first power spread signal using a second power spreading digital noise signal substantially similar to the first power spreading digital noise signal to generate a second digital signal substantially similar to the first digital signal;
   modifying the second digital signal using a third power spreading digital noise signal to generate a second power spread signal; and
   providing the second power spread signal for output to a second transmission line.

2. The method of claim 1, further comprising scaling the second digital signal prior to modifying the second digital signal.

3. The method of claim 1, wherein the first power spread signal is received and modified at a circuit device and the second power spread signal is modified and provided for output by the circuit device.

4. The method of claim 3 wherein the circuit device is one of an integrated circuit or a system-on-a-chip.

5. The method of claim 1, wherein the third power spreading digital noise signal is substantially similar to the second power spreading digital noise signal.

6. The method of claim 1, wherein at least one of the second or third power spreading digital noise signals comprises a pseudo-random digital signal.

7. The method of claim 1, wherein at least one of the second or third power spreading digital noise signals comprises a non-linear spreading signal.

8. The method of claim 1, wherein at least one of the second or third power spreading digital noise signals comprises a quadratic residue code sequence.

9. The method of claim 1, wherein at least one of the second or third power spreading digital noise signals comprises a polynomial series of values.

10. A circuit device comprising:
    an input operably coupled to a first transmission line;
    an output operably coupled to a second transmission line;
    a decoder comprising:
        a first input operably coupled to the input of the circuit device to receive a first power spread signal representative of a first digital signal modified by a first power spreading digital noise signal;
        a second input to receive a second power spreading digital noise signal, wherein the second power spreading digital noise signal is substantially similar to the first power spreading digital noise signal; and
        an output to provide a second digital signal substantially similar to the first digital signal; and
    an encoder comprising:
        a first input operably coupled to the output of the decoder to receive the second digital signal;
        a second input to receive a third power spreading digital noise signal; and
        an output operably coupled to the output of the circuit device to provide a second power spread signal for output to the second transmission line.

11. The circuit device of claim 10, further comprising:
    a first noise source having an output operably coupled to the second input of the decoder; and
    a second noise source having an output operably coupled to the second input of the encoder.

12. The circuit device of claim 10, wherein the second power spreading digital noise signal is substantially similar to the third power spreading digital noise signal.

13. The circuit device of claim 12, wherein the first noise source and the second noise source are a same noise source.

14. The circuit device of claim 10, further comprising a phase-locked loop having an input operably coupled to the output of the decoder and an output operably coupled to the first input of the encoder.

15. The circuit device of claim 14, further comprising a scaler having an input operably coupled to the output of the phase-locked loop and an output operably coupled to the first input of the encoder.

16. The circuit device of claim 10, wherein at least one of the second or third power spreading digital noise signals comprises a pseudo-random digital signal.

17. The circuit device of claim 10, wherein at least one of the second or third power spreading digital noise signals comprises a non-linear spreading signal.

18. The circuit device of claim 10, wherein at least one of the second or third power spreading digital noise signals comprises a quadratic residue code sequence.

19. The circuit device of claim 10, wherein at least one of the second or third power spreading digital noise signals comprises a polynomial series of values.

20. The circuit device of claim 10, wherein the circuit device comprises one of an integrated circuit or a circuit device-on-a-chip.

21. The circuit device of claim 10, wherein the input operably coupled to the first transmission line is further operably coupled to a third transmission line, where the first and third transmission lines represent a first differential pair transmission channel.

22. The circuit device of claim 21, wherein the output operably coupled to the second transmission line is further operably coupled to a fourth transmission line, where the second and fourth transmission lines represent a second differential pair transmission channel.

23. The circuit device of claim 10, wherein the output operably coupled to the second transmission line is further operably coupled to a third transmission line, where the second and third transmission lines represent a differential pair transmission channel.

* * * * *